Dec. 31, 1963  R. B. STANLEY  3,116,044
APPARATUS AND METHOD FOR DETERMINING BEARING
CONDITION OF RAILWAY CAR JOURNAL BOXES
Filed June 8, 1959  29 Sheets-Sheet 1
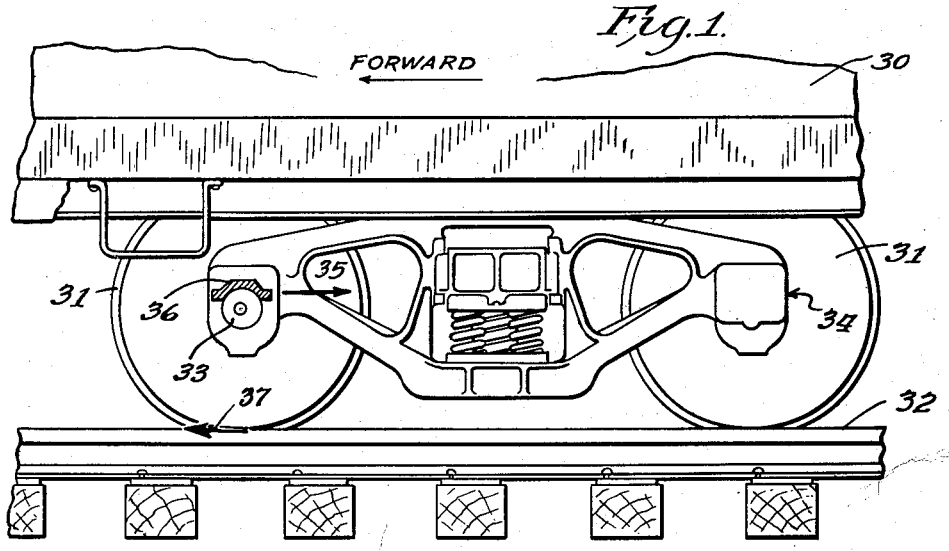
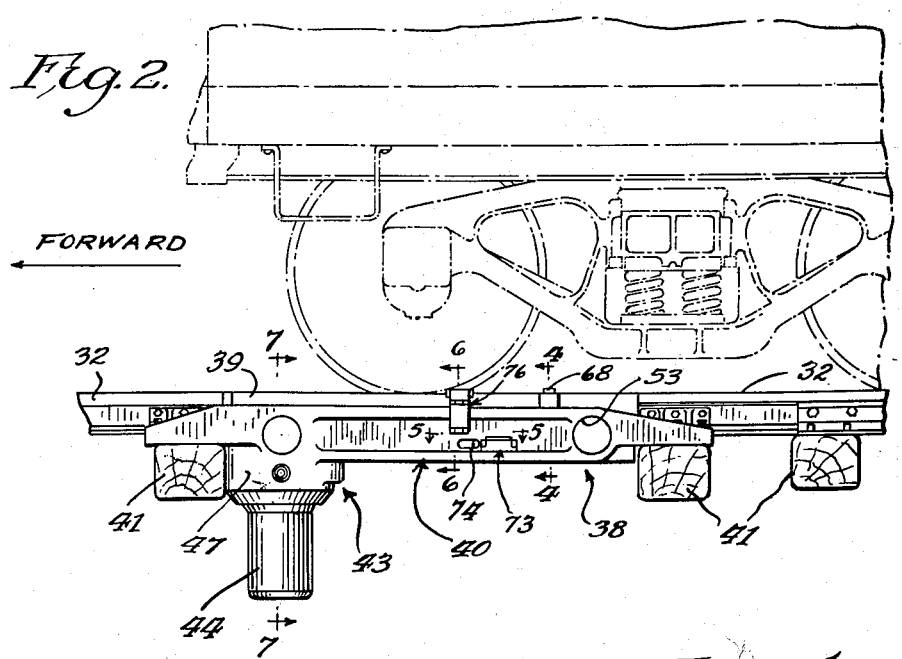
Inventor
Richard B. Stanley
By
Mann, Brown & McWilliams
Attys.

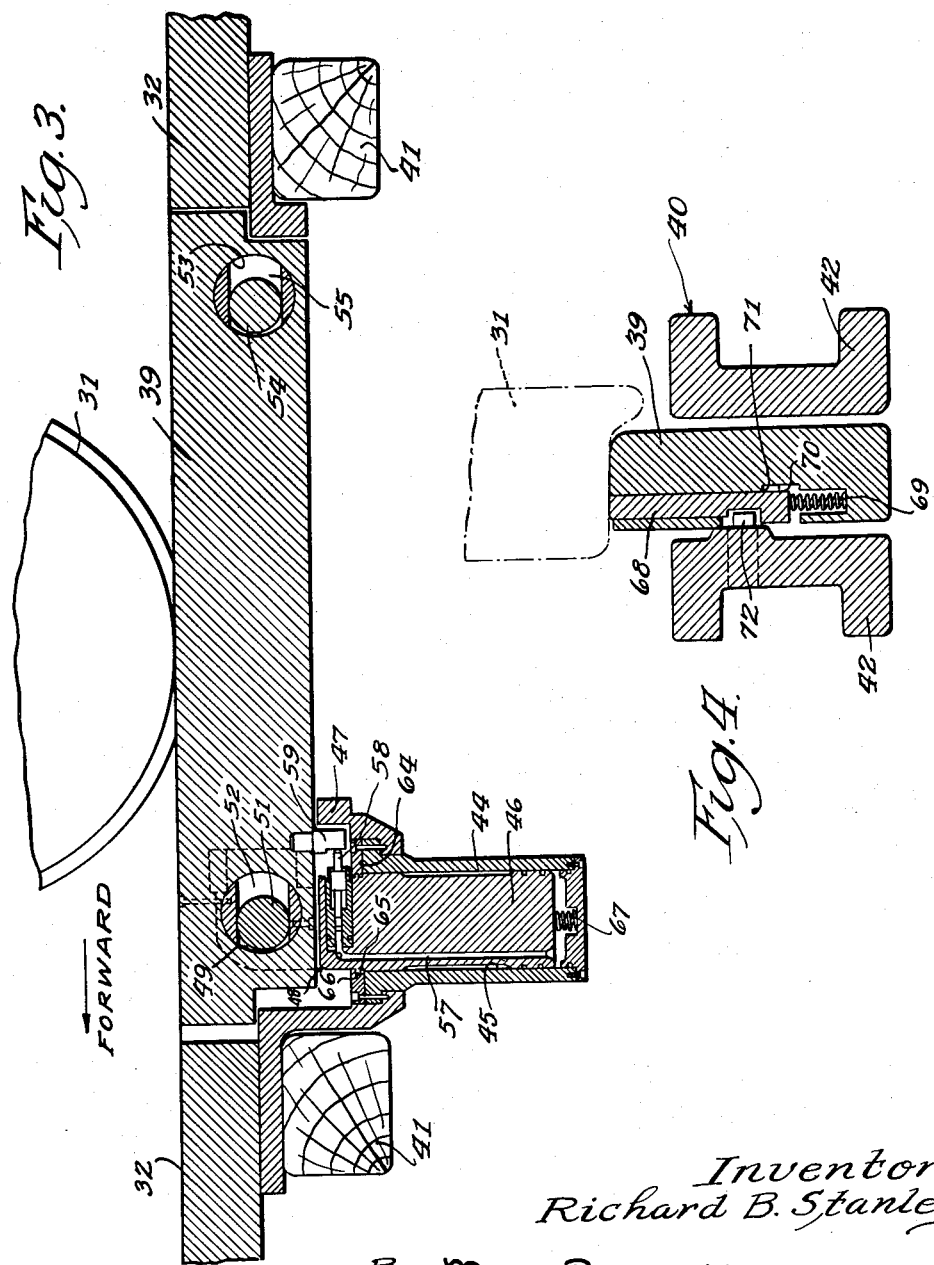

Dec. 31, 1963 R. B. STANLEY 3,116,044
APPARATUS AND METHOD FOR DETERMINING BEARING
CONDITION OF RAILWAY CAR JOURNAL BOXES
Filed June 8, 1959 29 Sheets-Sheet 3
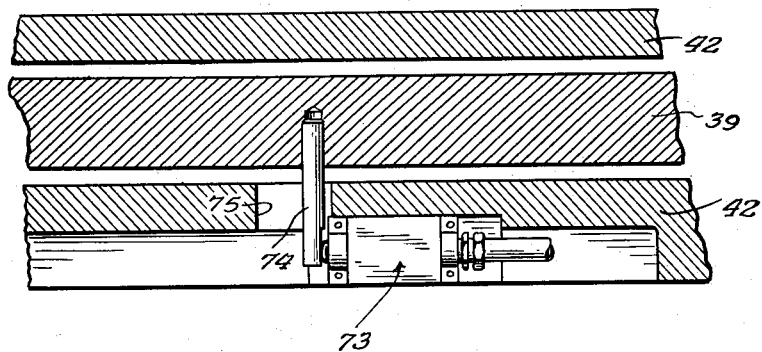
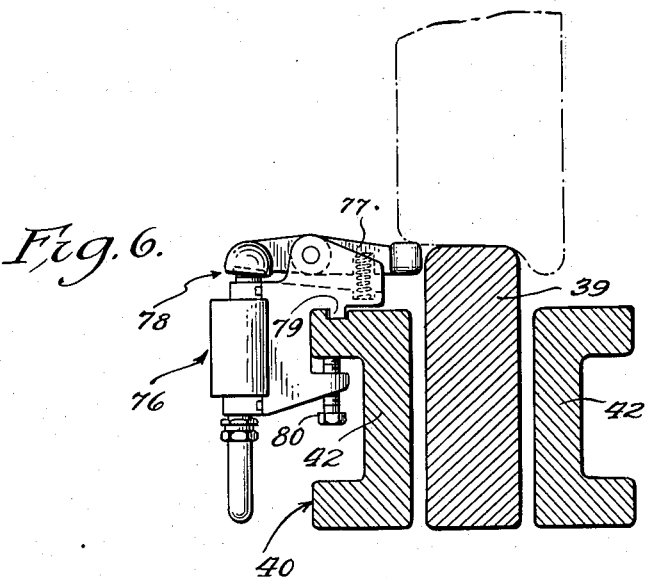
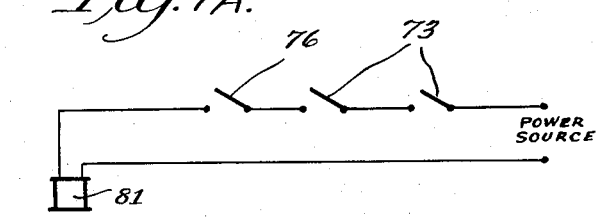
Inventor
Richard B. Stanley.
By Mann, Brown & McWilliams
Attys.

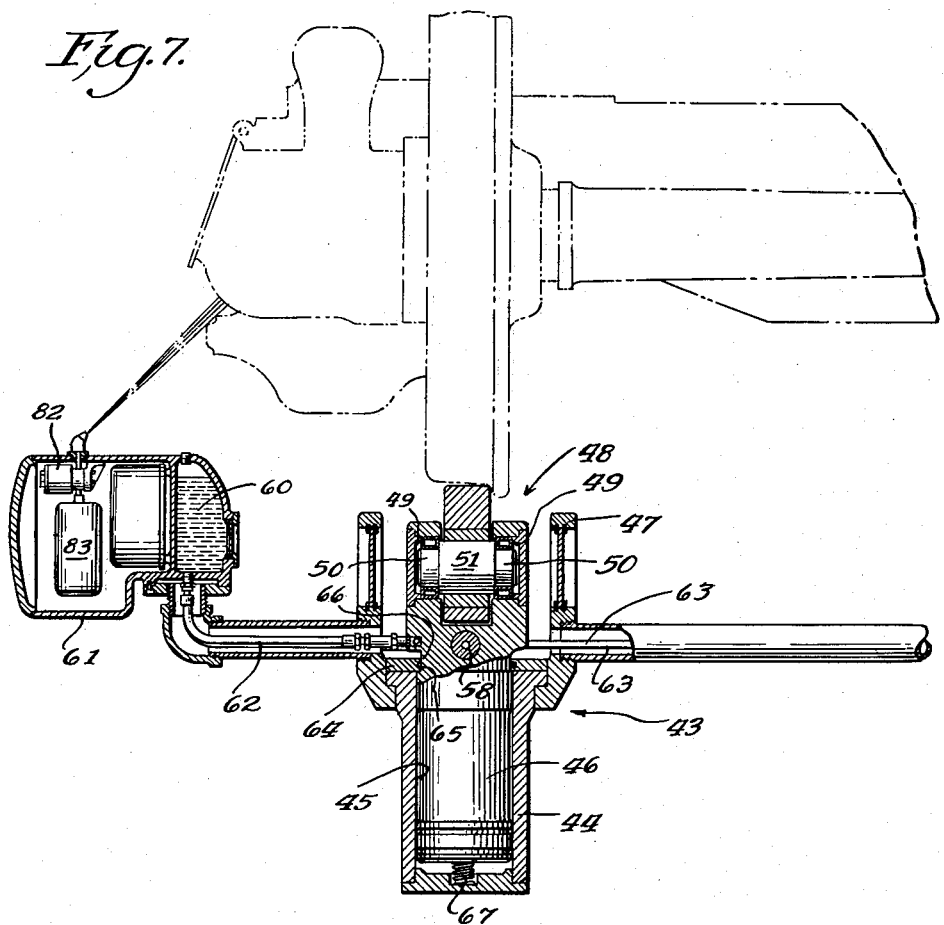
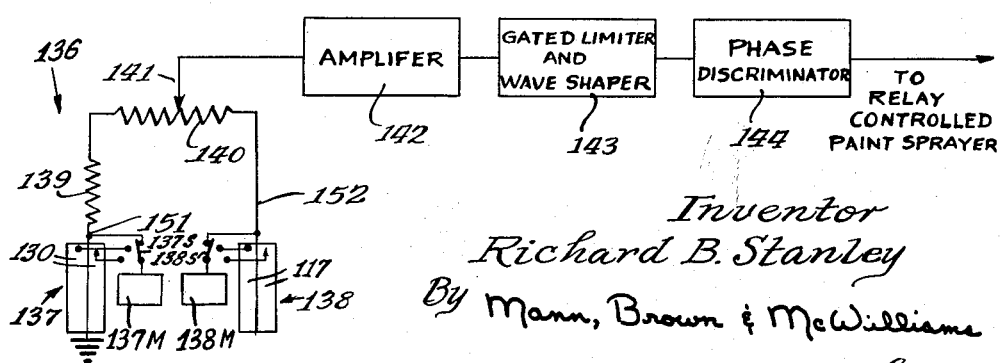

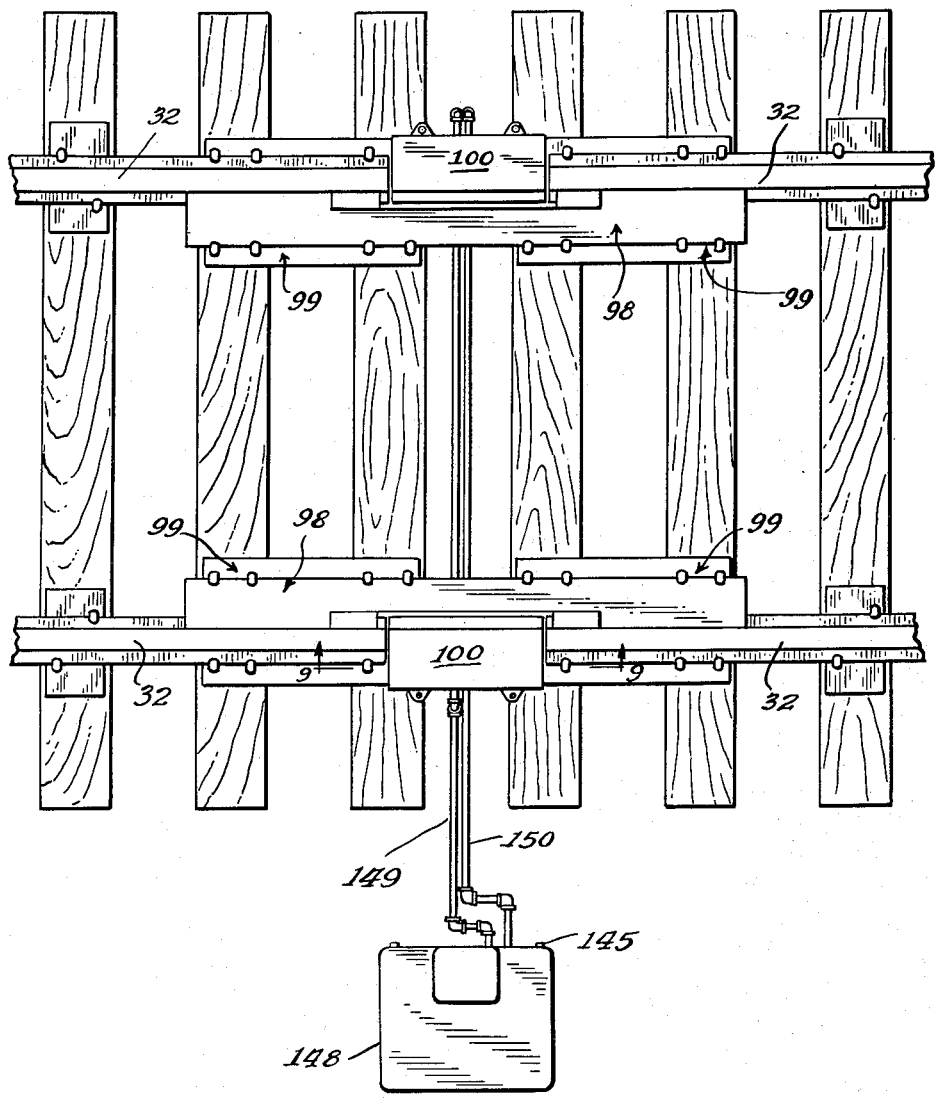

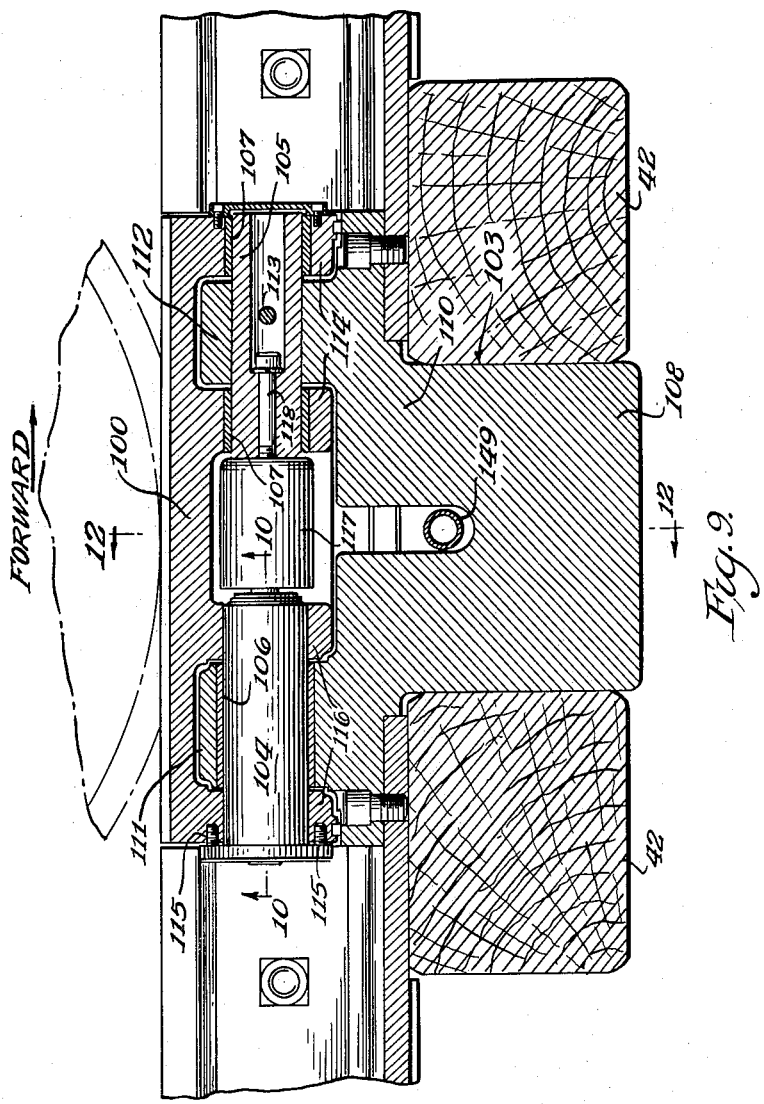

INVENTOR.
Richard B. Stanley
BY
Mann, Brown & McWilliam
Attys.

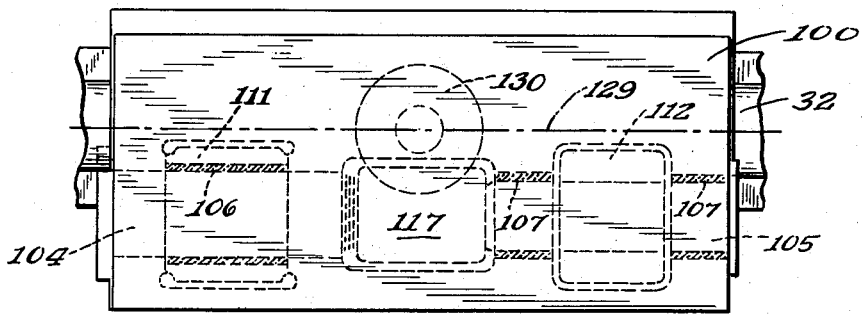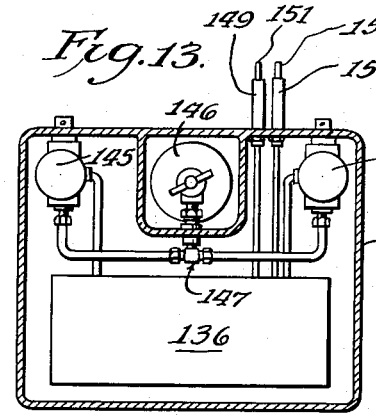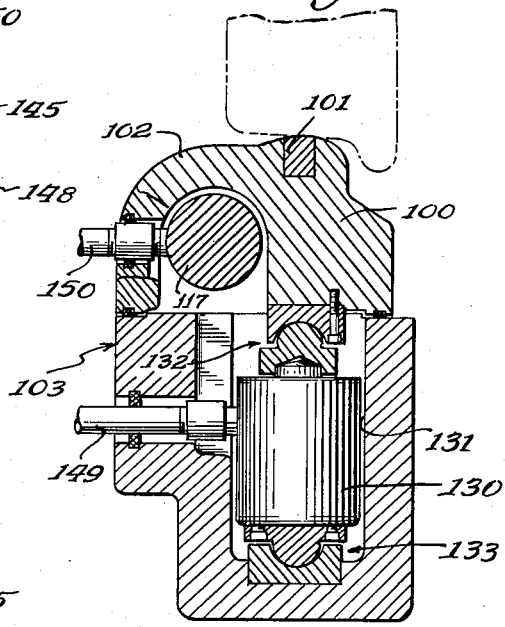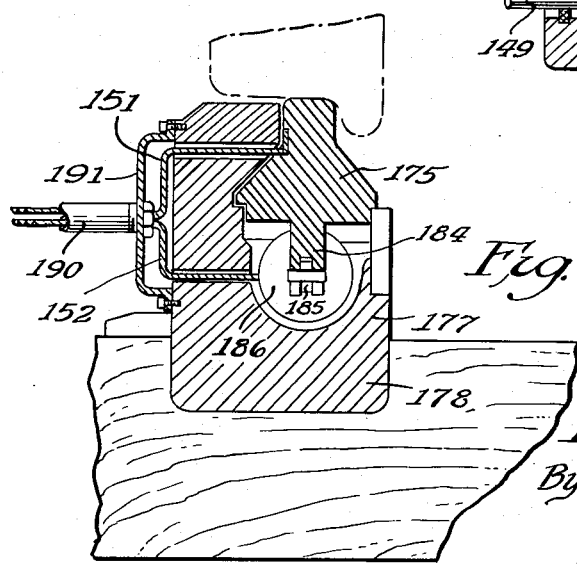

INVENTOR.
Richard B. Stanley
BY Mann, Brown & McWilliams
ATTORNEYS

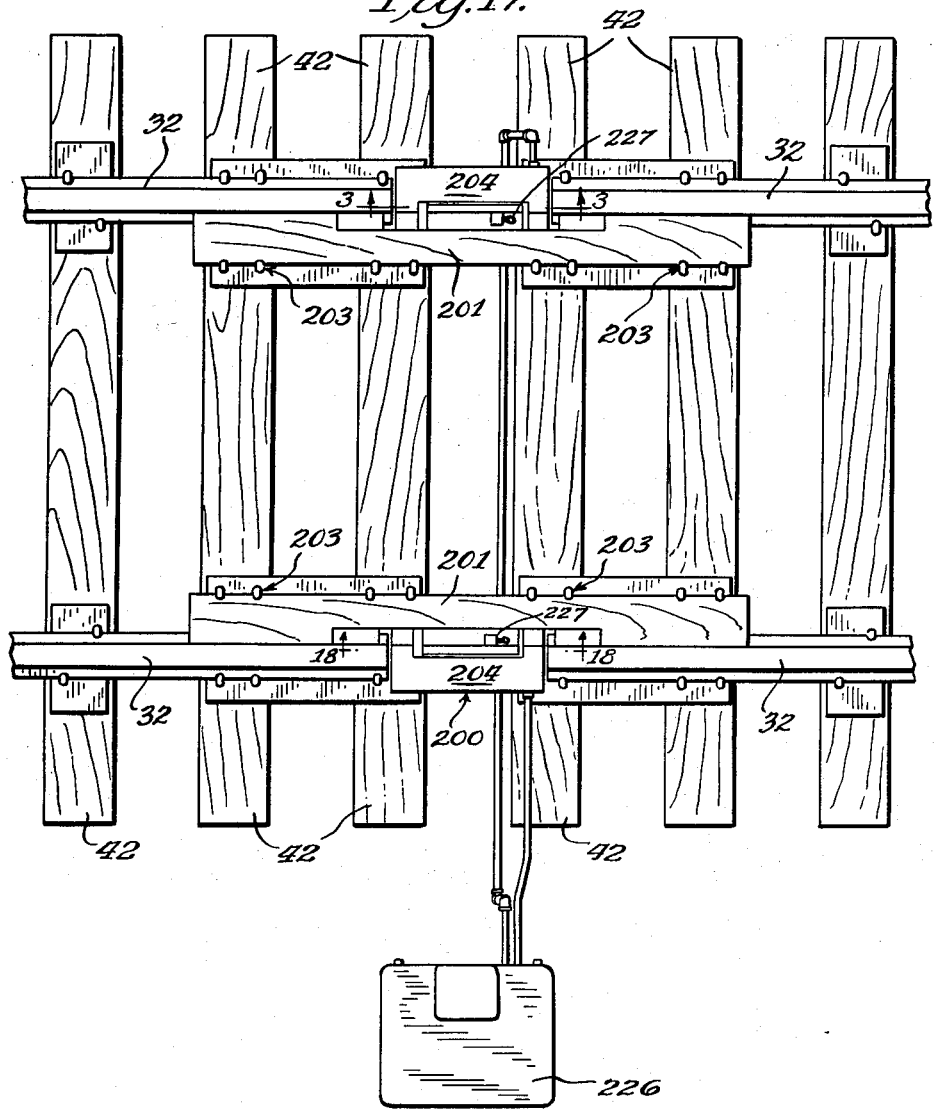

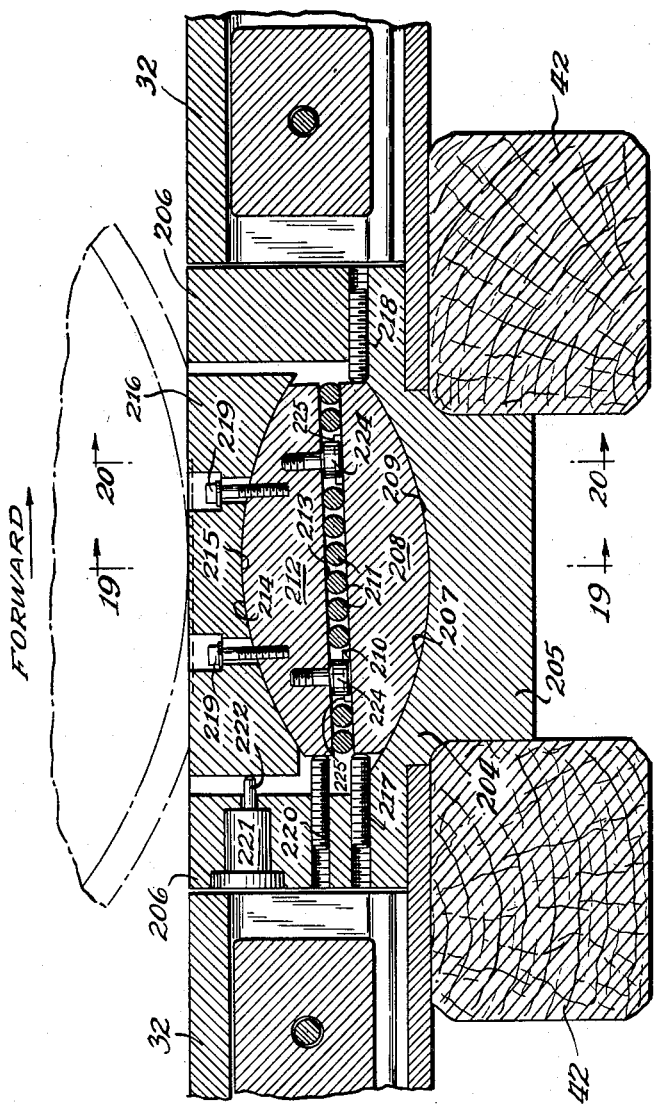

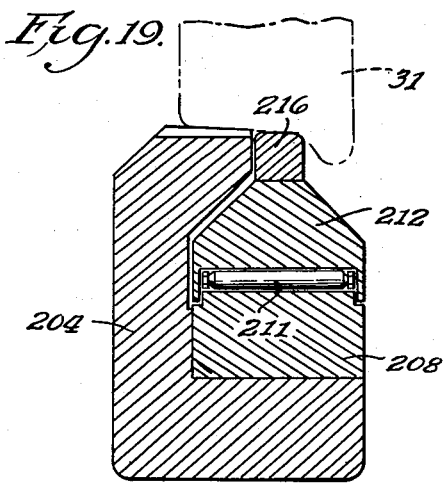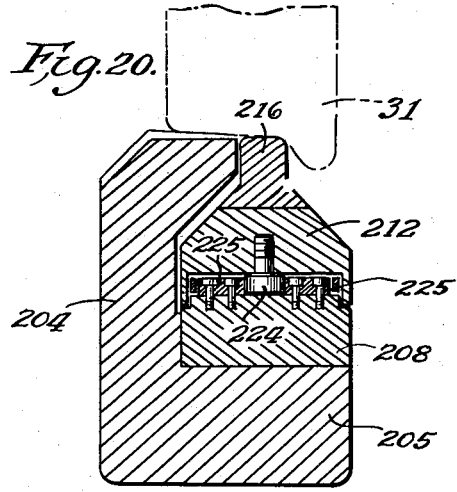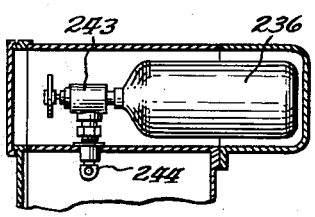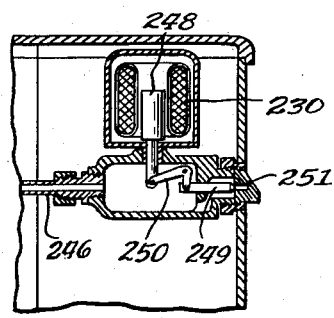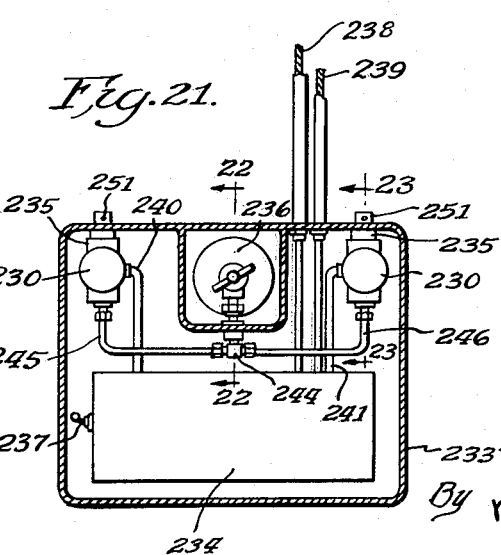
Inventor
Richard B. Stanley
By Mann, Brown & McWilliams
Attys

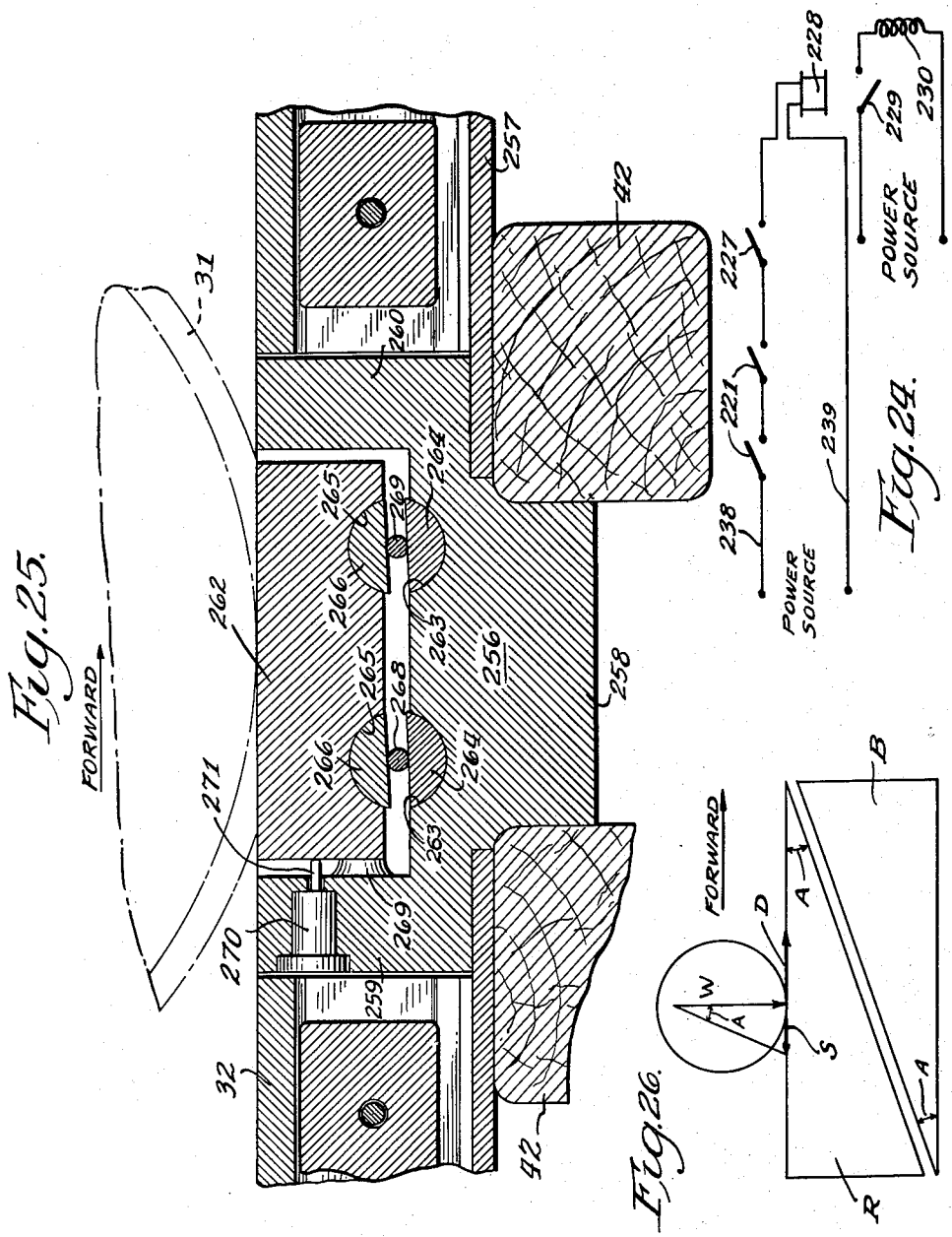

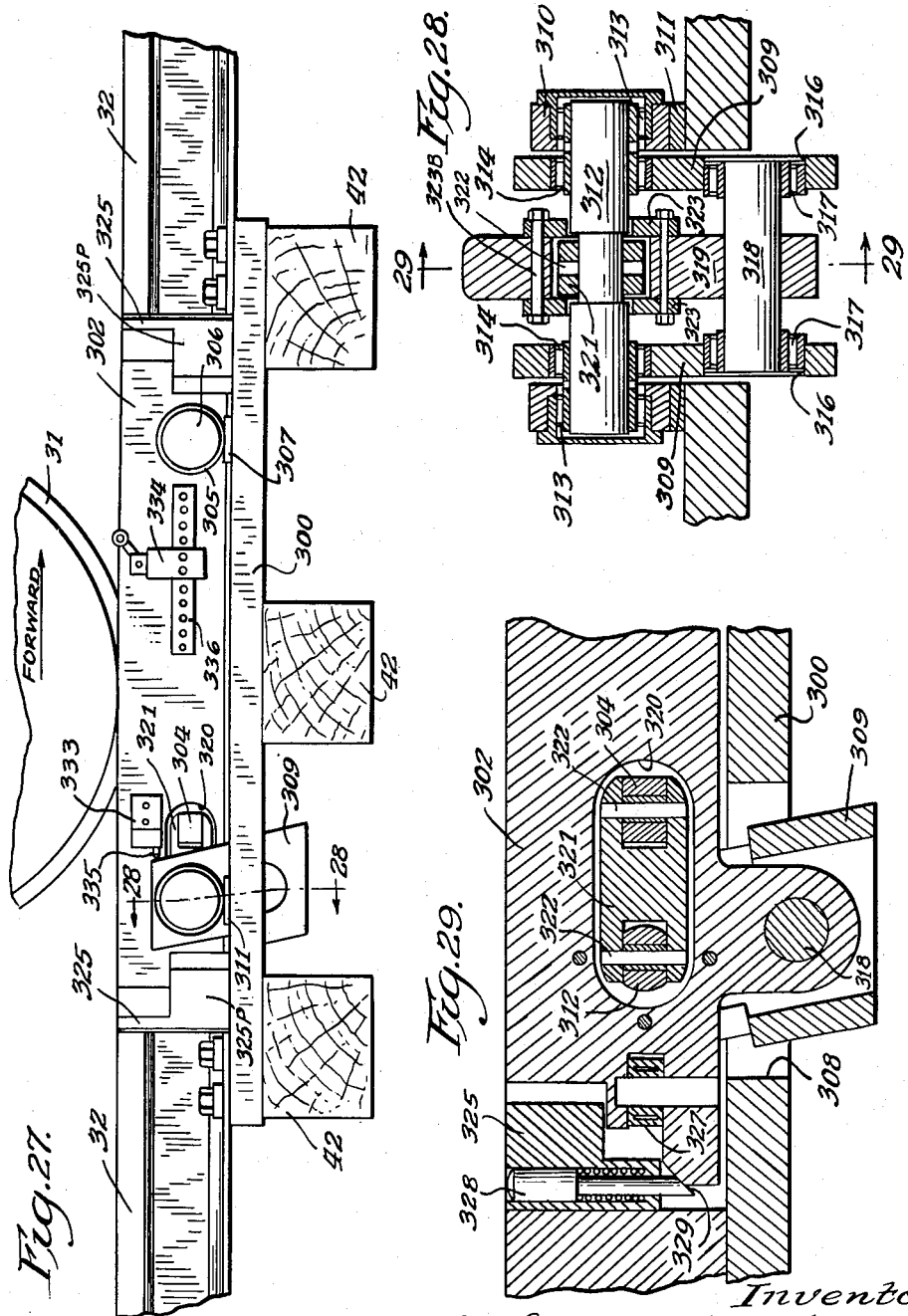

Dec. 31, 1963 R. B. STANLEY 3,116,044
APPARATUS AND METHOD FOR DETERMINING BEARING
CONDITION OF RAILWAY CAR JOURNAL BOXES
Filed June 8, 1959 29 Sheets-Sheet 15
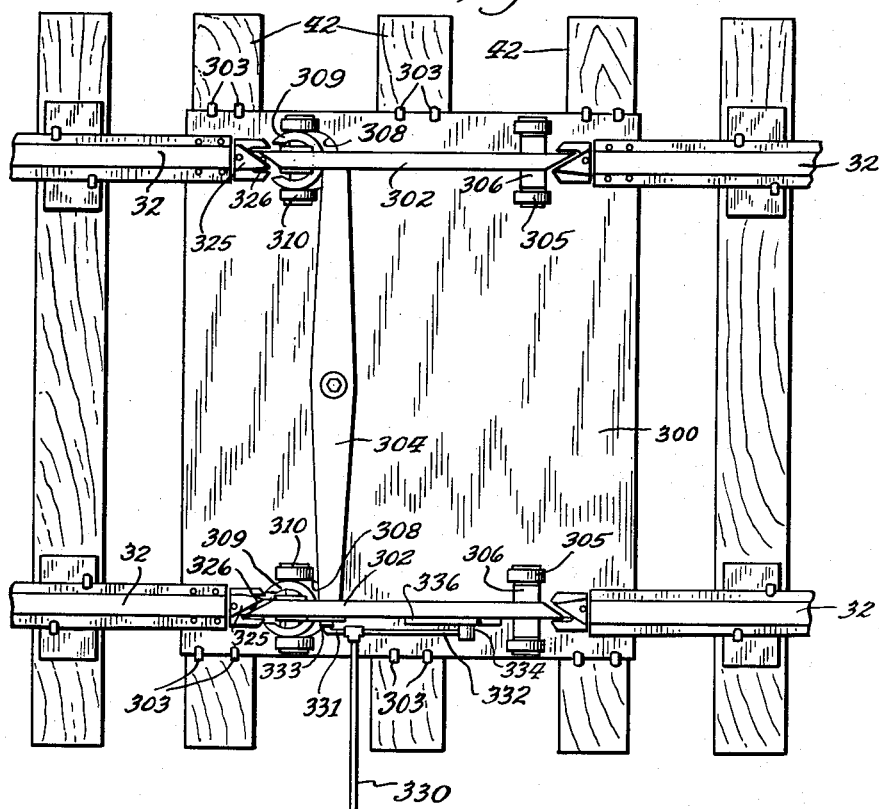
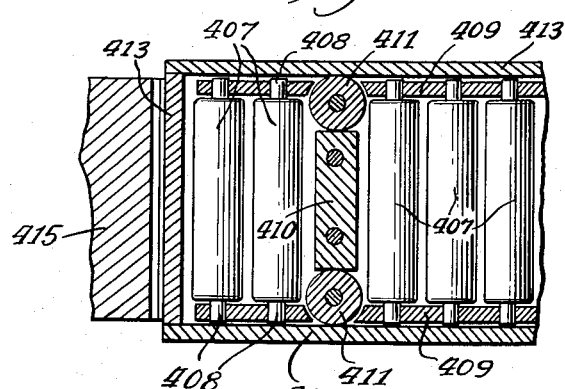
Inventor
Richard B. Stanley
By Mann, Brown & McWilliams
Attys.

Inventor
Richard B. Stanley
By Mann, Brown & McWilliams
Attys.

Dec. 31, 1963  R. B. STANLEY  3,116,044
APPARATUS AND METHOD FOR DETERMINING BEARING
CONDITION OF RAILWAY CAR JOURNAL BOXES
Filed June 8, 1959  29 Sheets-Sheet 17
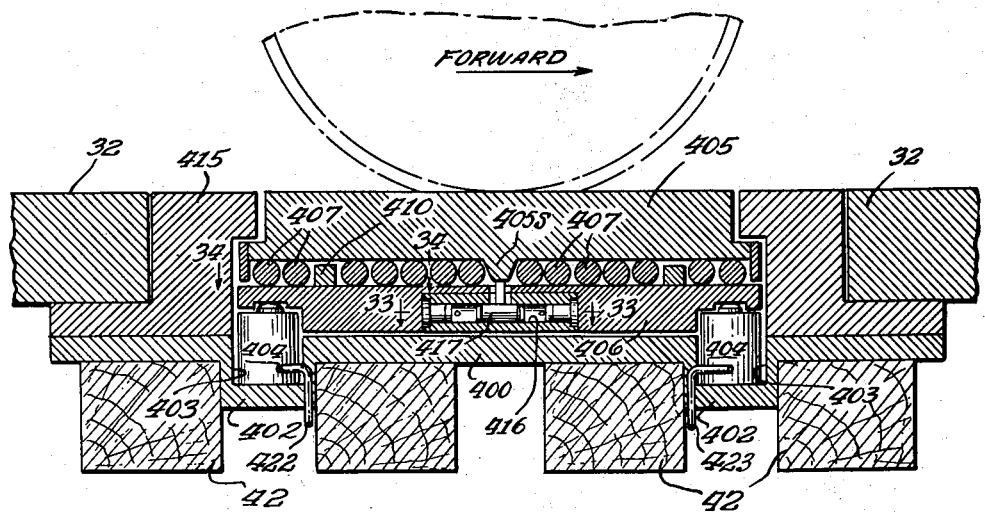
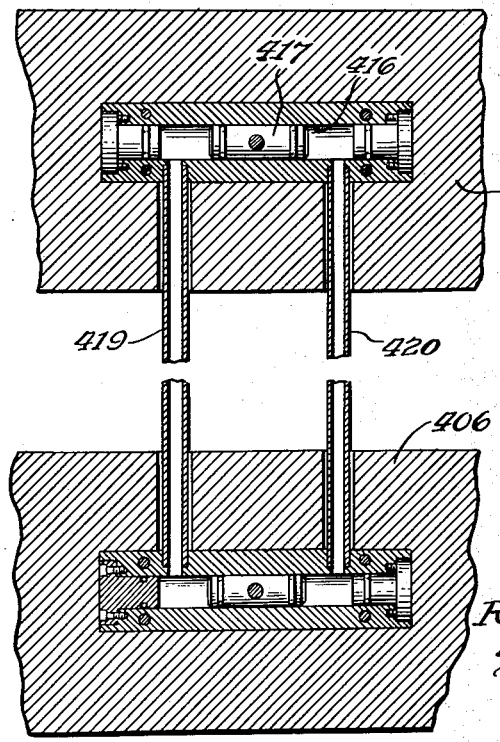
Inventor
Richard B. Stanley
By
Mann, Brown & McWilliams
Attys.

Dec. 31, 1963  R. B. STANLEY  3,116,044
APPARATUS AND METHOD FOR DETERMINING BEARING
CONDITION OF RAILWAY CAR JOURNAL BOXES
Filed June 8, 1959  29 Sheets-Sheet 18
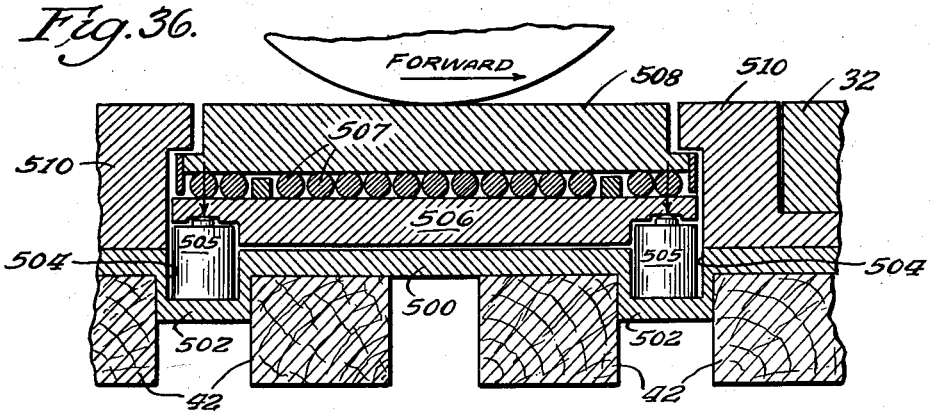
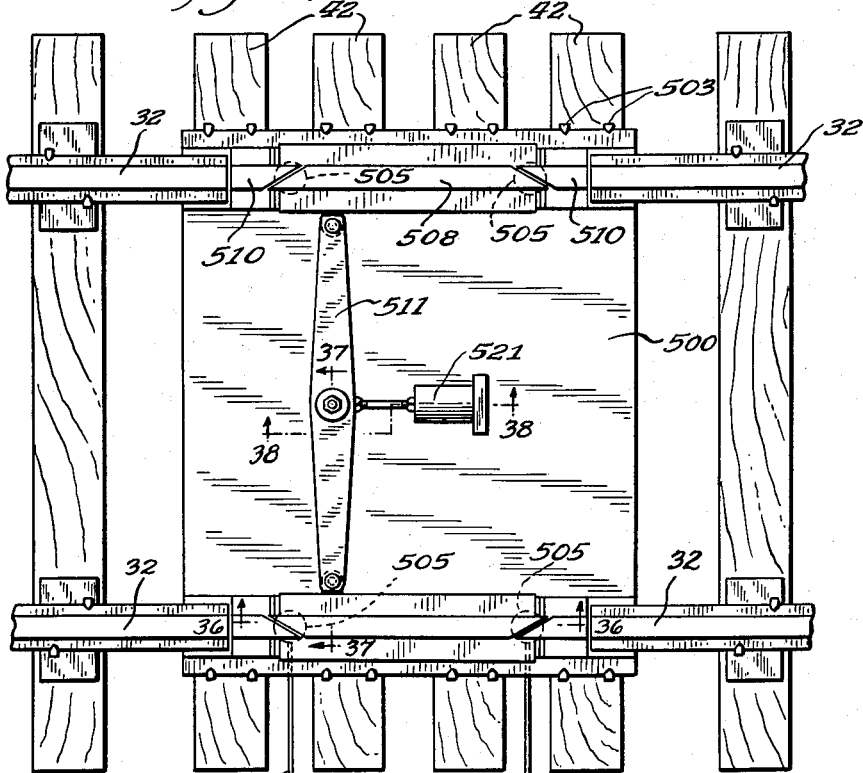
Inventor
Richard B. Stanley
By Mann, Brown & McWilliams
Attys.

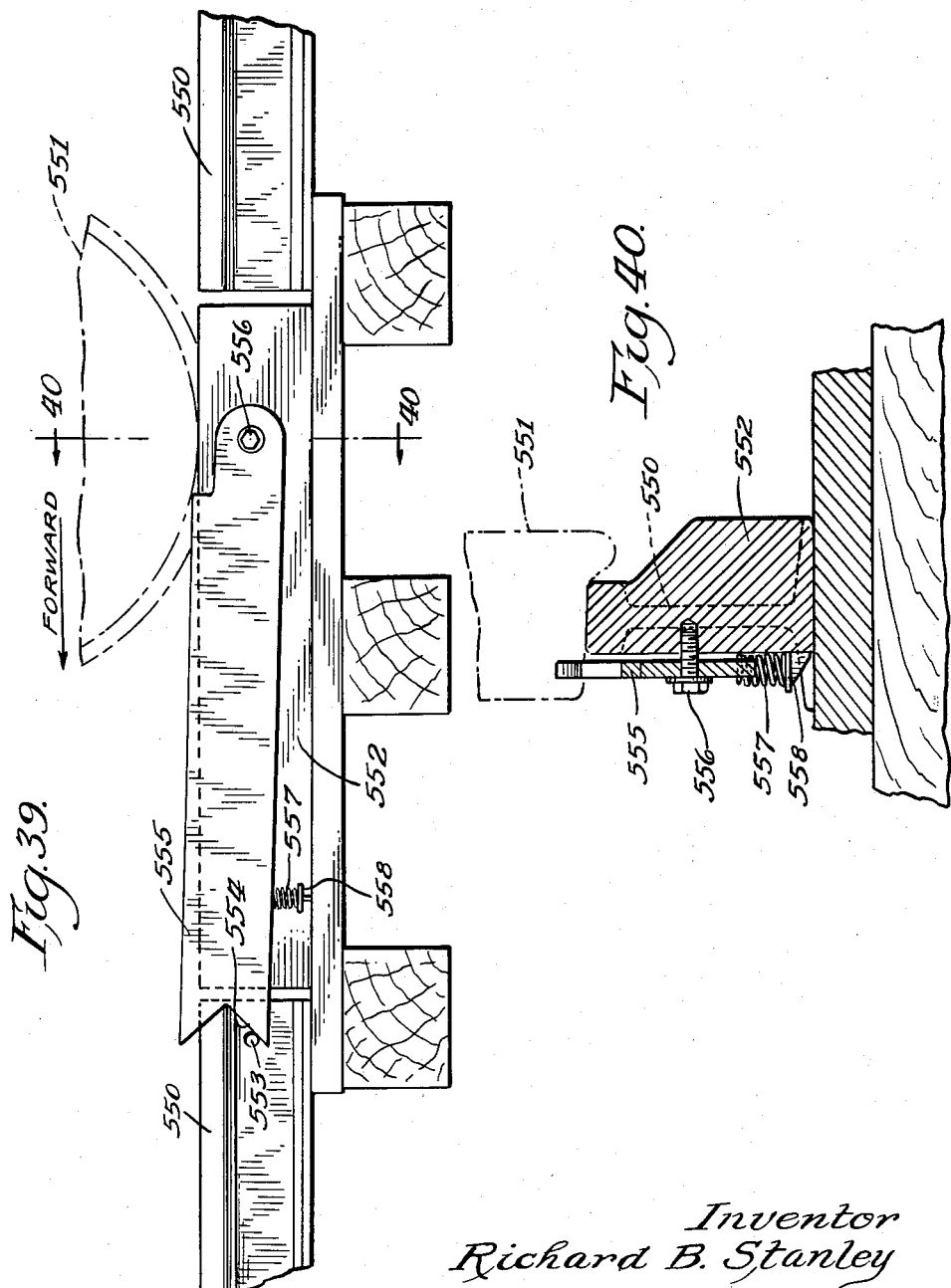

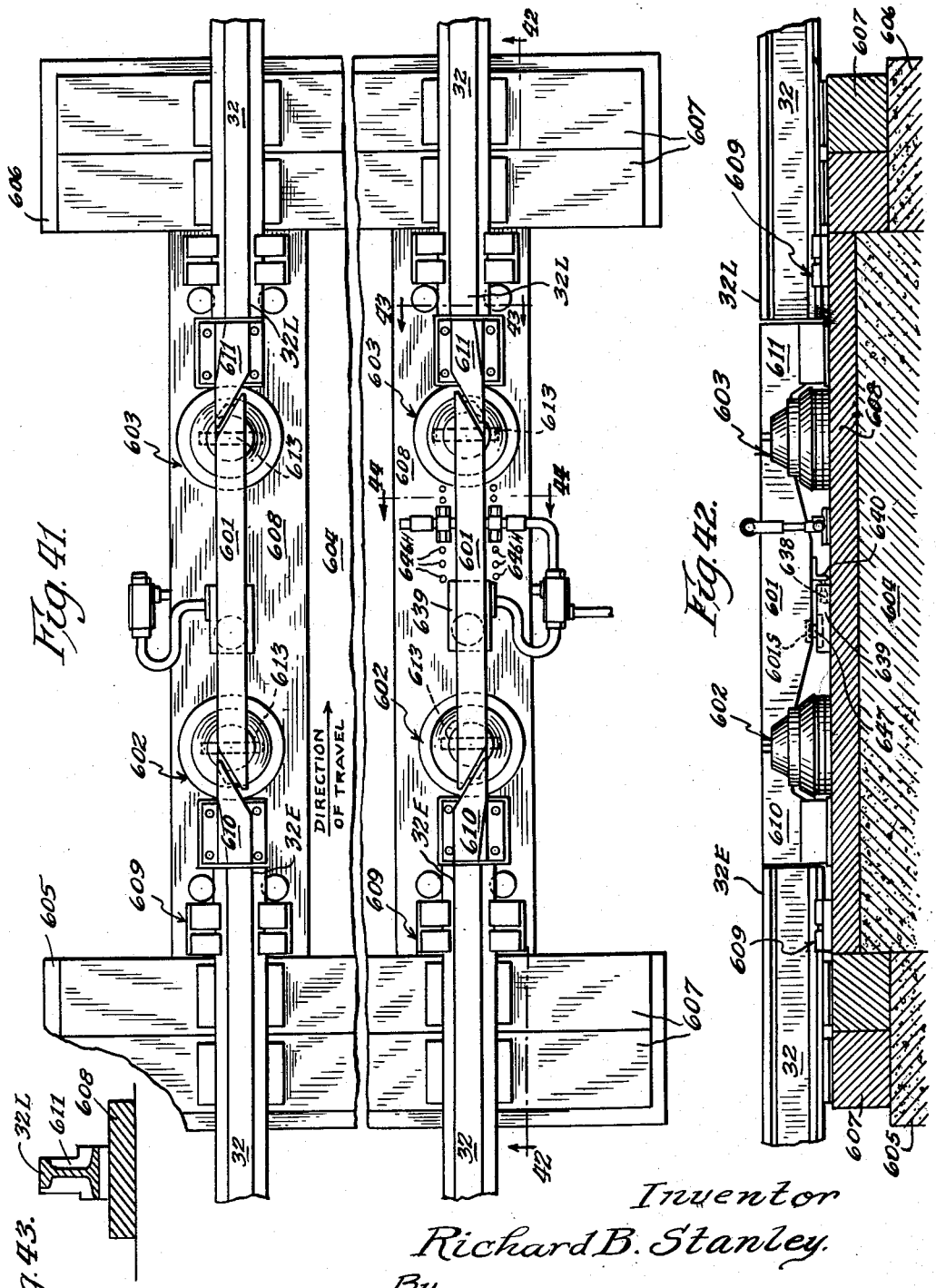

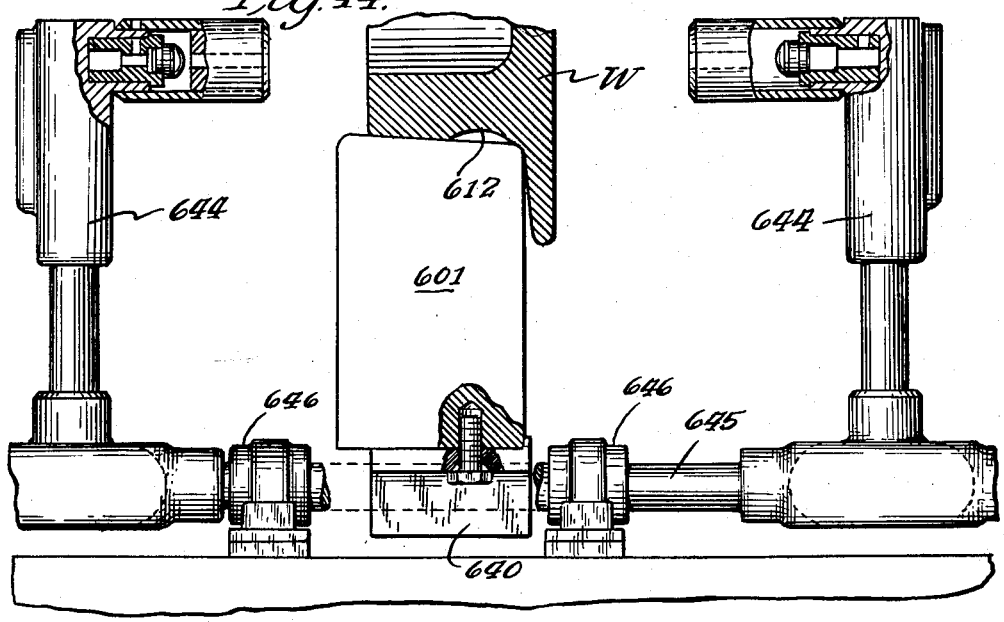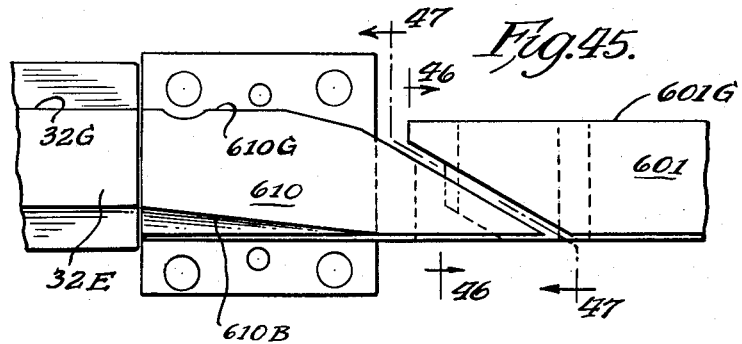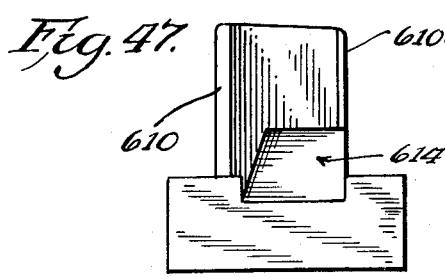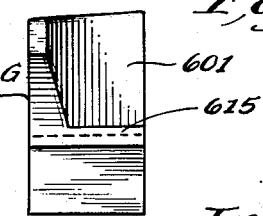

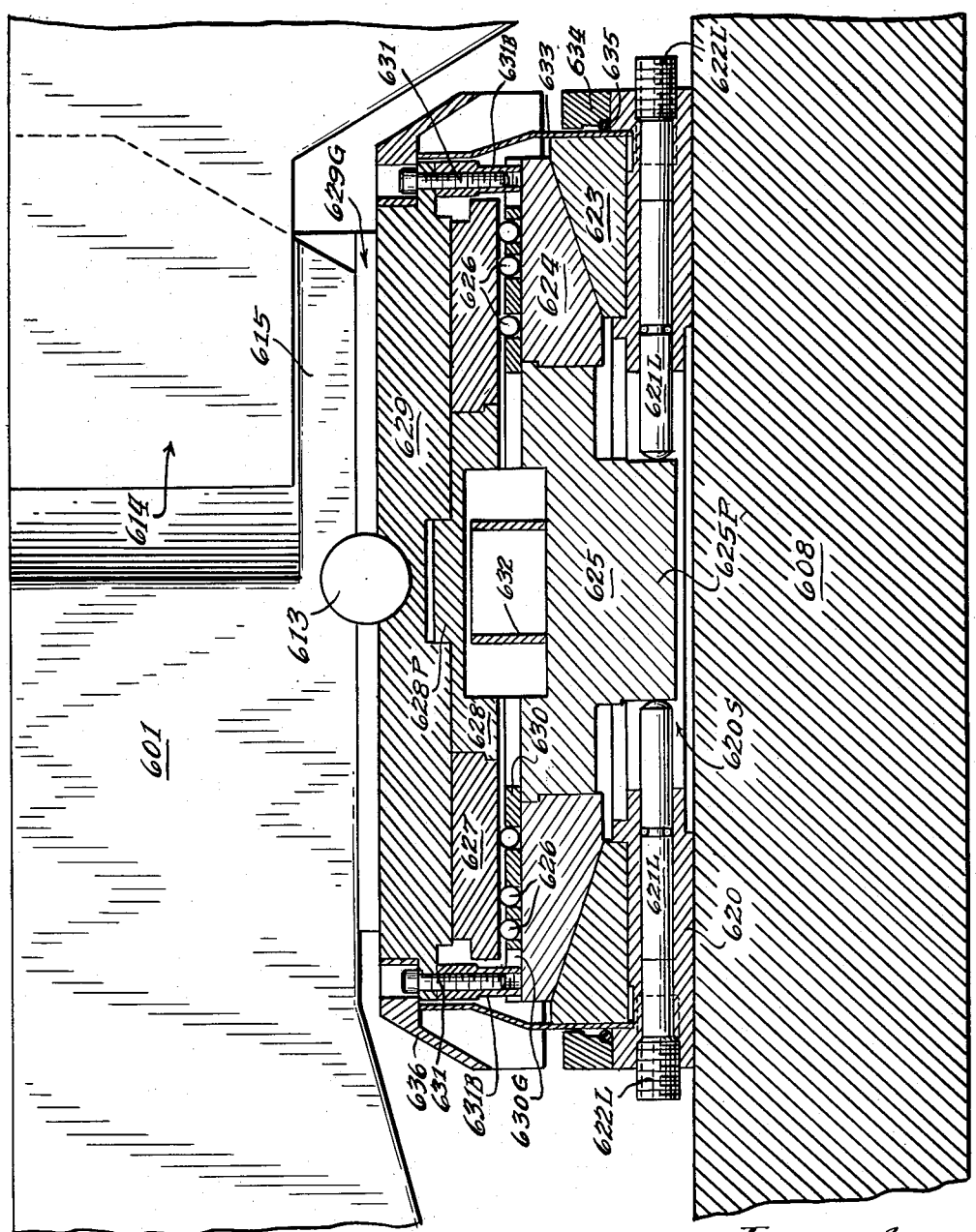

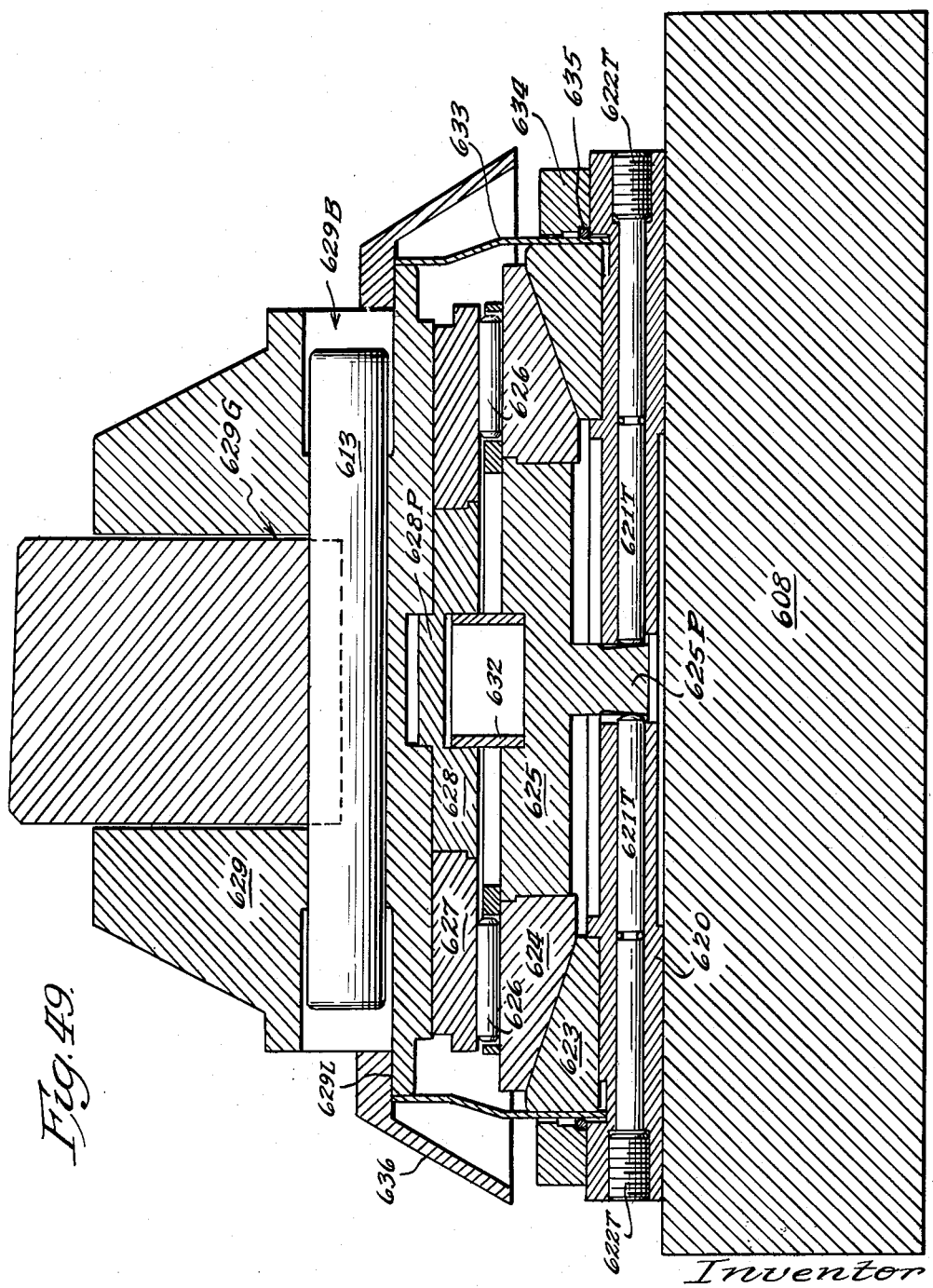

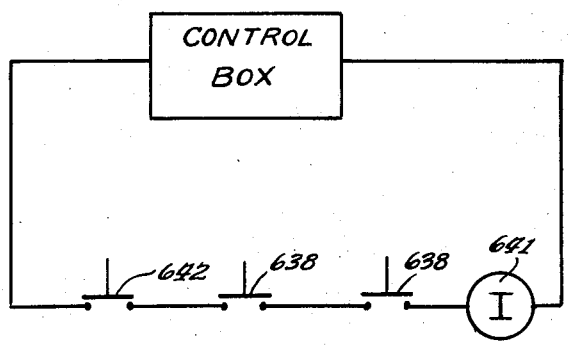
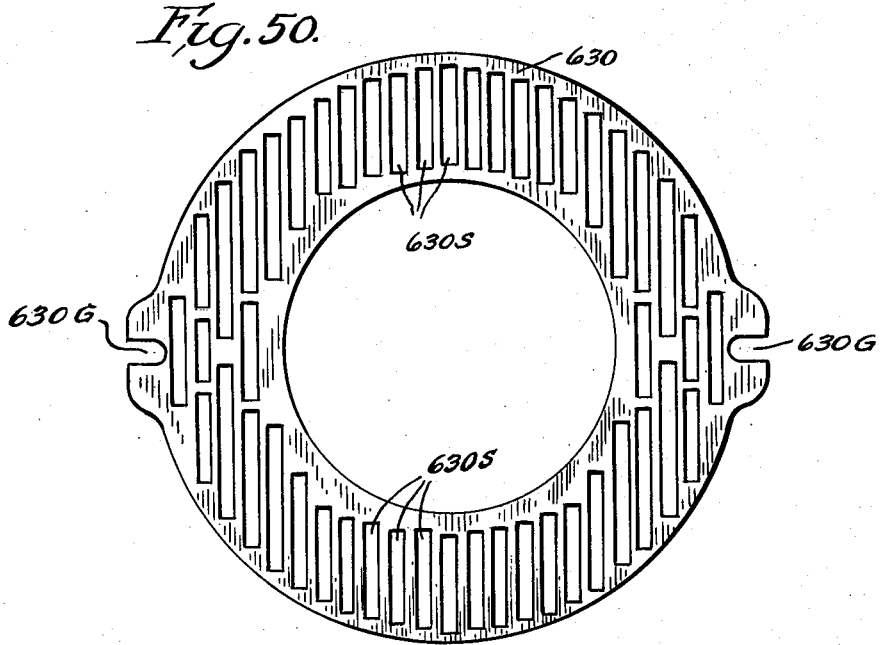

Dec. 31, 1963 R. B. STANLEY 3,116,044
APPARATUS AND METHOD FOR DETERMINING BEARING
CONDITION OF RAILWAY CAR JOURNAL BOXES
Filed June 8, 1959 29 Sheets-Sheet 26

Inventor
Richard B. Stanley
By
Mann, Brown and McWilliams
Attys.

Dec. 31, 1963 R. B. STANLEY 3,116,044
APPARATUS AND METHOD FOR DETERMINING BEARING
CONDITION OF RAILWAY CAR JOURNAL BOXES
Filed June 8, 1959 29 Sheets-Sheet 27
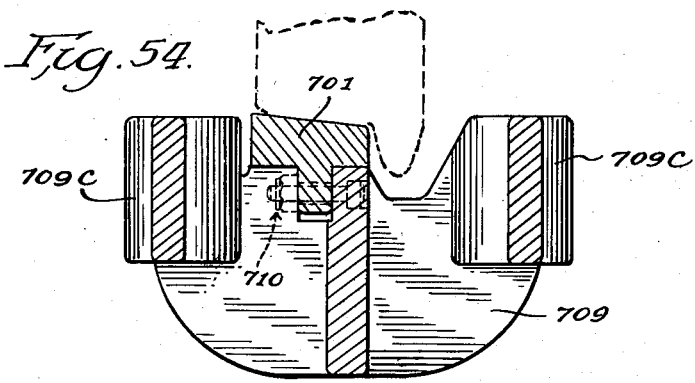
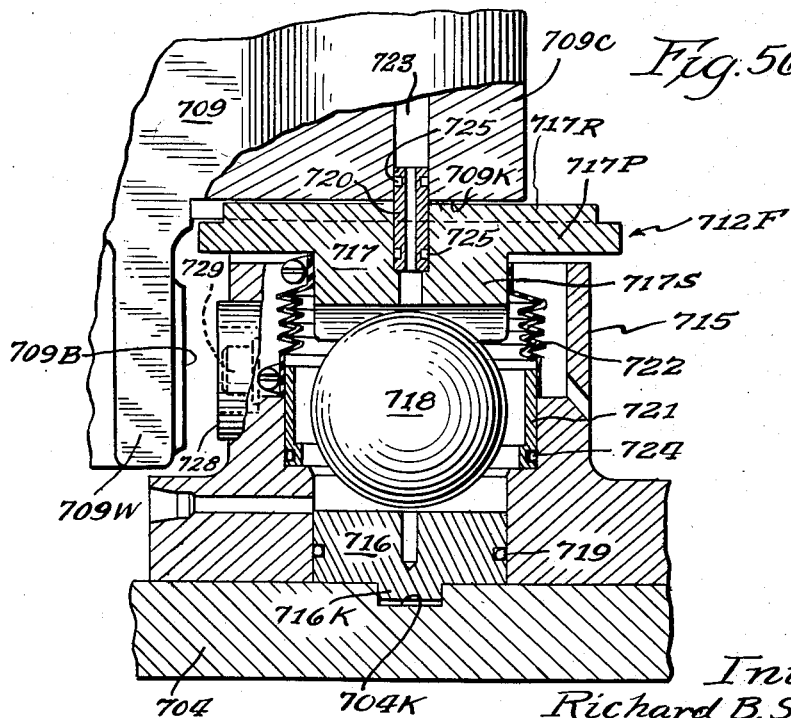
Inventor
Richard B. Stanley
By
Mann, Brown and McWilliams.
Attys.

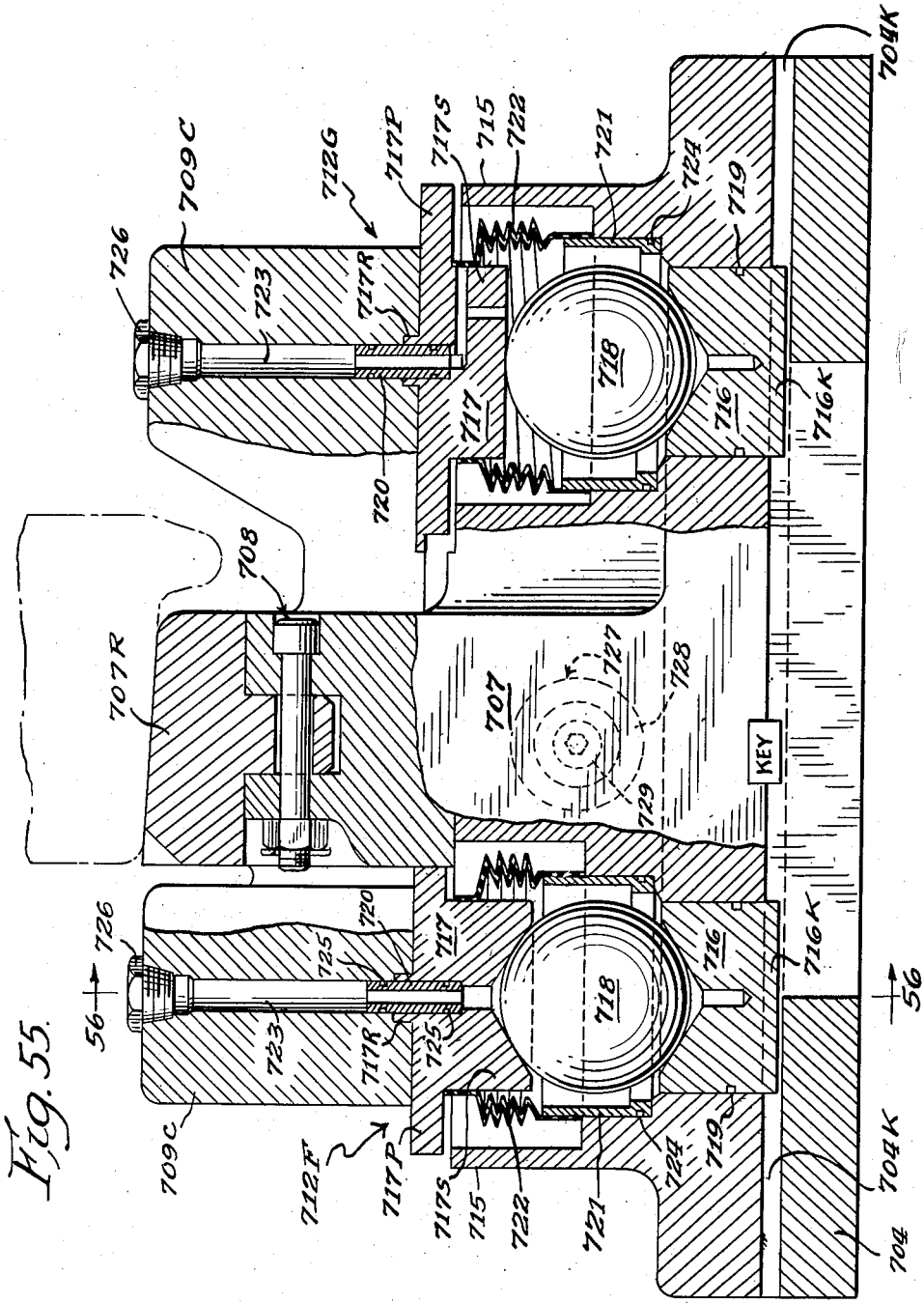

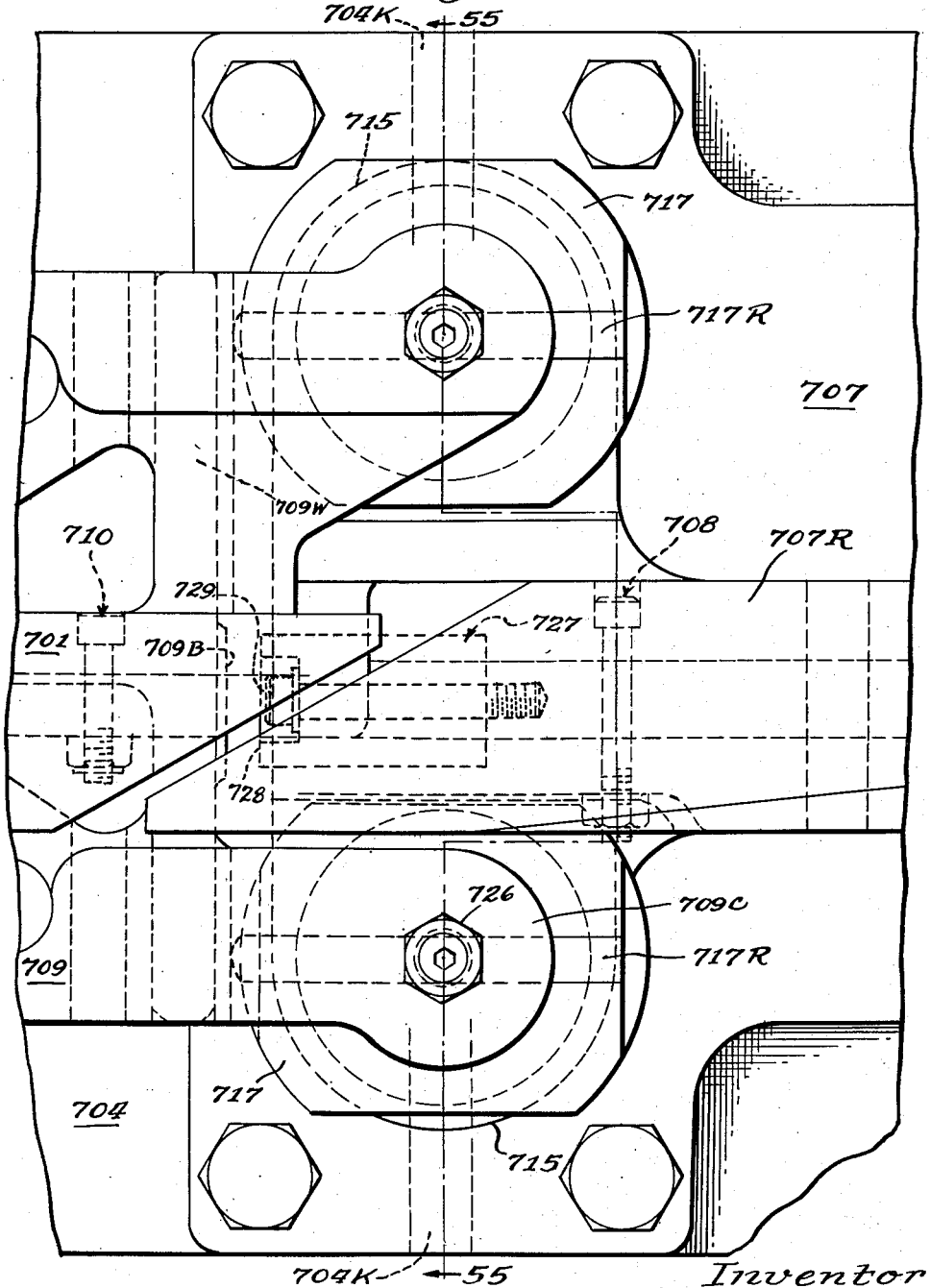

United States Patent Office 3,116,044
Patented Dec. 31, 1963

3,116,044
APPARATUS AND METHOD FOR DETERMINING BEARING CONDITION OF RAILWAY CAR JOURNAL BOXES
Richard B. Stanley, Park Ridge, Ill., assignor to Free-Roll Tester Corporation, a corporation of Illinois
Filed June 8, 1959, Ser. No. 818,857
36 Claims. (Cl. 246—246)

This application is filed as a continuation-in-part of my copending application, Serial No. 553,602, filed December 16, 1955, now abandoned, the disclosure of which is hereby specifically incorporated by reference.

This invention relates to a device for determining the operating condition of railway car journal boxes and more particularly is concerned with trackside apparatus capable of determining the drag-to-weight ratio imposed on the track rails by the car wheels while rolling over the rails.

The frequency and seriousness of bearing failures experienced by railroads in freight train operations has been a serious concern of the railroad industry. The losses in time and money from accidents, train delays, car setouts, equipment and lading damage resulting from bearing failures are very great. A bearing failure or hotbox, as it is known, is the overheating of the wheel journal and babbitt-lined bearing caused by increased friction. This condition may progress to the point where the babbitt is melted, the lubricating oil set aflame, and eventually the journal broken off.

Hotboxes are caused by one or more of several well-known factors, such as oil-carrying waste caught between the bearing and the journal, worn-out bearings, dry packing, dirt in boxes, flat wedges and high bearing pressures. Any of these tends to break or separate the load-carrying oil film, permitting metal-to-metal contact, with resulting increase of friction and heat. It has been shown that the oil film may separate at over 1,000 p.s.i. bearing pressure. Frequency of hotboxes is also subject to wide seasonal variations. Warmer months show a marked increase in occurrences due to the greater difficulty of heat dissipation in borderline bearing conditions.

The present invention seeks to eliminate bearing failures by providing improved facilities for the inspection and detection of hotboxes. It is proposed to provide a track-installed device in cutout portions of both running rails so as to present an unbroken and continuous track for passage of the wheels thereover and it is contemplated that the detecting installation be located advantageously with regard to immediate servicing.

The present invention takes advantage of the fact that the conditions and forces which lead to the development of a hotbox are of such magnitude as to allow detection of an incipient hotbox. It has been determined that the increase in friction of a bad bearing is great enough to be measured before it ordinarily would become apparent and this permits the bearing failure to be detected in its earlier stages.

A car wheel is subject to a certain amount of bearing friction which resists the turning of the axle journal in the bearing. The force of this resistance in a normal bearing with adequate oil film is a function of the weight and the coefficient of friction and increases as the weight on the axle or the coefficient increases. This resistance causes a linear force at the rail head which tends to push the rail in the direction of travel.

There is, in addition, another linear force component at the rail head that arises due to the rolling friction between the car wheel and the rail head, and tests have shown that these individual resistance components are substantially independent of the speed of operation. Tests with dynamometer cars have established that the pull required to overcome the force of friction in normal operation with good bearings and a flat straight roadway is approximately 6 pounds per ton of weight on the axles.

This tendency of the wheels to try to push the rails forward may be augmented by flat spots on the wheel treads and dragging brakes; flange pressure against the side of the rails will also produce an increase. In addition, the tendency of the car truck is to seek a position of dynamic equilibrium as it produces an interchange of forces between the rails, wheels, bearing and truck components. This is due to such factors as the normal taper or cone shape of the wheel tread contour, differences in diameter of wheels on the same axle and rough or uneven roadways.

It is the principal object of the present invention to determine the ratio of the linear resistance force appearing at the rail head to the weight imposed on the rail. This is accomplished by providing a device that incorporates a weight sensing mechanism and a drag or linear force sensing mechanism. The ratio of the drag to the weight imposed by any given axle is an indication of the true bearing resistance in pounds per ton as measured at the rail head. When the drag-to-weight ratio is of a higher value than that which is normally experienced, it is an indication that a bad bearing may be present.

According to the present invention, these general principles may be applied in two rather different ways. One way is to make an independent determination of the actual forces imposed on the rail as a car wheel progresses over the device and to make a direct comparison of the ratio of these measured forces with a ratio value that is considered normal or at least acceptable. The other method is to incorporate into the device a stability of a predetermined ratio that is preferably also adjustable. Thus, if a wheel exerts a drag force in excess of the opposite stabilizing force, the resultant unbalance in the forward direction will actuate a detector and indicate a bad bearing.

It will be remembered that bad flat spots and dragging brakes may also cause a false indication of a bad bearing, but subsequent inspection will readily reveal such defects which may then be remedied. According to the invention, a track layout arrangement for the test section whereon the rails of the test section are of wider gauge may be employed for minimizing or eliminating the effects of flat spots on the rim of the car wheels. In addition, adverse effects from the tendency of the trucks to hunt or ride on unequal diameters of the two wheels on the same axle or the actual difference in the diameters of the wheels themselves must be countered.

As is well known, both wheels are integral with the axle and because of this, in cases where the wheels are of unequal diameter, they tend to impose oppositely directed forces upon the rails, that is, the larger wheel tends to push its associated rail rearwardly and the smaller wheel tends to push its rail forwardly. Thus, the force exerted by the larger wheel opposes the linear drag forces, whereas the force exerted by the small wheel reinforces the linear drag force. In actual practice it has been found that the forces generated by the differences in wheel diameter may be of such great magnitude as to obscure the drag forces unless appropriate measures for eliminating such forces are taken. Means are provided for minimizing or eliminating these effects and this may be accomplished by allowing relative movement between the test sections of rail.

It is further proposed to provide means for marking or otherwise calling attention to a particular journal box as it passes over the device if a bad bearing indication is received by the sensing mechanism.

Other objects and advantages of the present invention will become apparent as the description proceeds.

In the accompanying drawings forming a part of this specification and in which like numerals are employed to designate like parts throughout the same:

FIG. 1 is a side elevational view illustrating a portion of a railway car traveling along a conventional set of tracks;

FIG. 2 is a side elevational view illustrating a portion of a railway car traveling over a track section provided with apparatus representing one embodiment of the present invention;

FIG. 3 is a side sectional view taken through one of the track rails of FIG. 2;

FIG. 4 is a sectional view of a rail lock taken in the vertical plane of line 4—4 of FIG. 2;

FIG. 5 is a sectional plan view taken in the horizontal plane of line 5—5 of FIG. 2;

FIG. 6 is a sectional view of a wheel-operated switch and is taken in the vertical plane of line 6—6 of FIG. 2;

FIG. 7 is a front sectional view taken in the vertical plane of line 7—7 of FIG. 2;

FIG. 7A is a diagram of the electrical circuit for the switches employed in connection with the embodiment of FIGS. 2–7;

FIG. 8 is a top plan view of a track section provided with apparatus representing a second embodiment of the invention;

FIG. 9 is a side sectional view taken in the vertical plane of line 9—9 of FIG. 8;

FIG. 11 is a fragmentary top plan view illustrating the relative location of various portions of the apparatus of FIG. 8;

FIG. 12 is a sectional view through the apparatus taken in the vertical plane of line 12—12 of FIG. 9;

FIG. 13 is a plan sectional view through a control box;

FIG. 14 is a schematic electrical diagram of a ratio discriminator circuit used in conjunction with the apparatus of FIGS. 8–13;

FIG. 16 is a sectional view taken in the vertical plane of line 16—16 of FIG. 15;

FIG. 17 is a top plan view of a track section provided with apparatus representing a third embodiment of the invention;

FIG. 18 is a side sectional view taken in the vertical plane of line 18—18 of FIG. 17;

Figure 31:
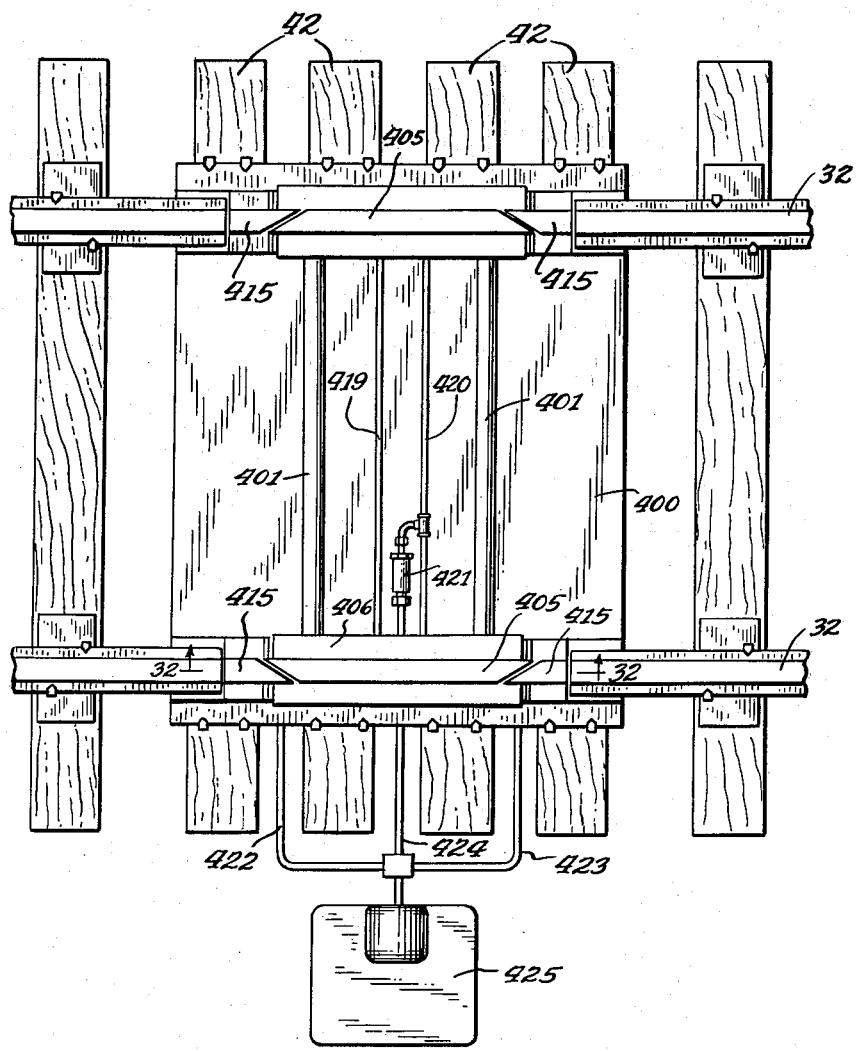
Figure 37:
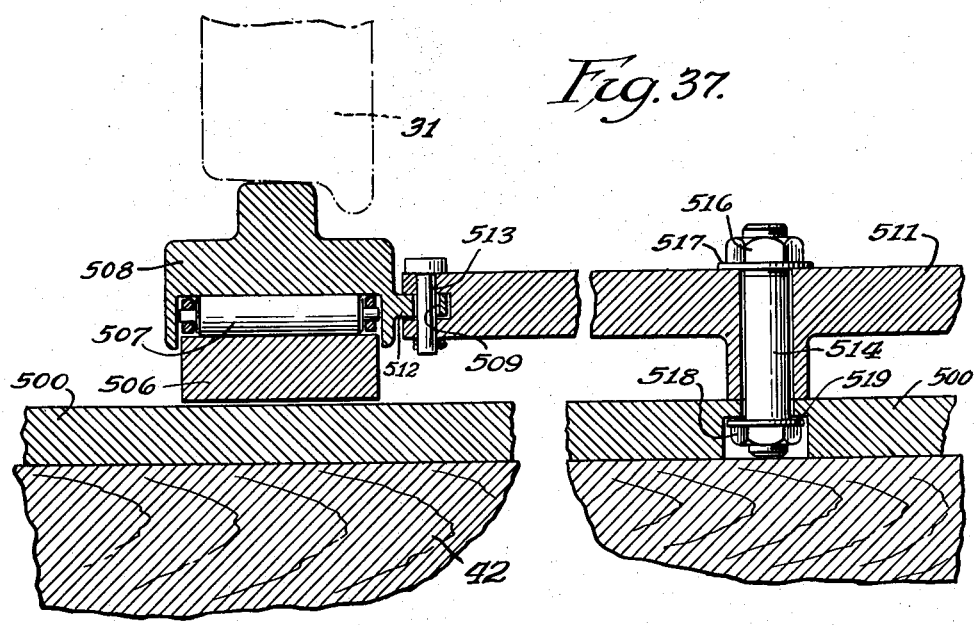
Figure 38:
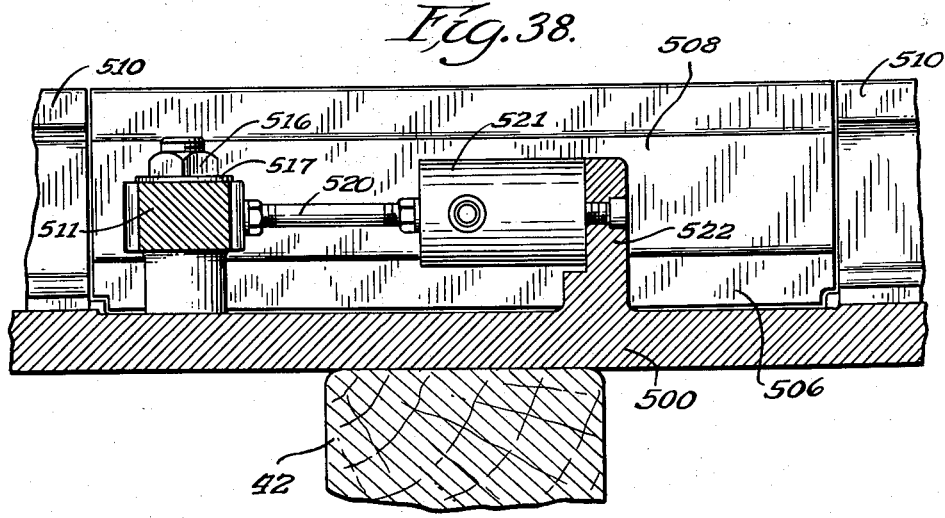
Figure 52:
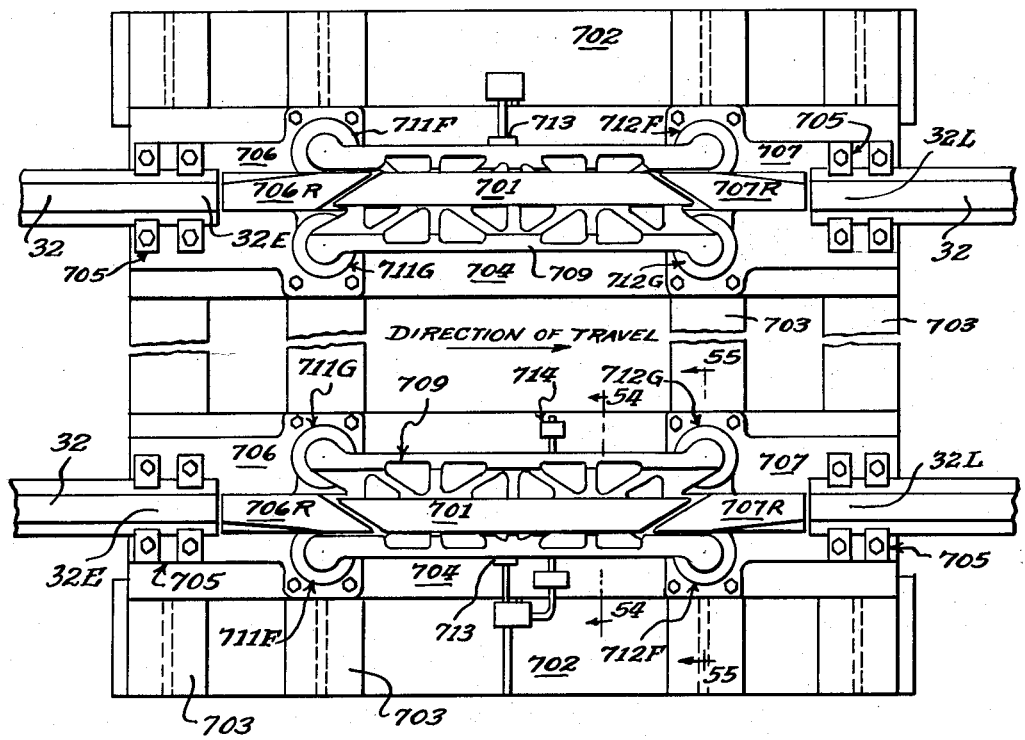
Figure 53:
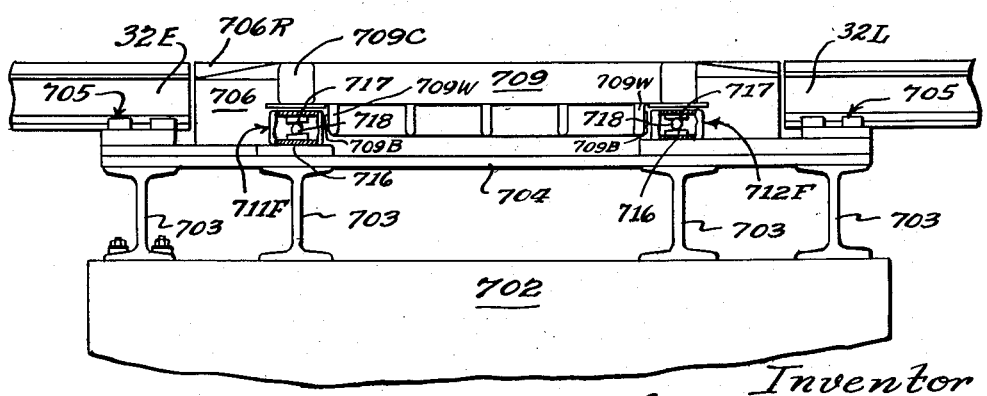

FIGS. 19 and 20 are fragmentary sectional views taken in the vertical planes of lines 19—19 and 20—20, respectively, of FIG. 18;

FIG. 21 is a sectional view of a control box;

FIGS. 22 and 23 are fragmentary sectional views taken in the vertical planes of lines 22—22 and 23—23, respectively, of FIG. 21;

FIG. 24 is a diagram of the electrical circuit for the switches employed in the apparatus of FIGS. 17–23;

FIG. 25 is a side sectional view of a modification of the embodiment of FIGS. 17–23;

FIG. 26 is a schematic diagram of the forces involved in the inclined plane arrangements of FIGS. 17–25;

FIG. 27 is a side elevational view of apparatus representing a fourth embodiment of the invention;

FIG. 28 is a sectional view taken in the vertical plane of line 28—28 of FIG. 27;

FIG. 29 is a fragmentary sectional view taken in the vertical plane of the line 29—29 of FIG. 28;

FIG. 30 is a top plan view of the apparatus of FIG. 27;

FIG. 31 is a top plan view of apparatus representing a fifth embodiment of the invention;

FIG. 32 is a side-sectional view taken in the vertical plane of line 32—32 of FIG. 31;

FIGS. 33 and 34 are fragmentary sectional views taken in the horizontal planes of lines 33—33 and 34—34, respectively, of FIG. 32;

FIG. 35 is a top plan view of apparatus representing a sixth embodiment of the invention;

FIG. 36 is a side-sectional view taken in the vertical plane of line 36—36 of FIG. 35;

FIGS. 37 and 38 are fragmentary sectional views taken in the vertical planes of the lines 37—37 and 38—38, respectively, of FIG. 35;

FIG. 39 is a diagrammatic side-elevational view illustrating a centering attachment in accordance with the invention;

FIG. 40 is a sectional view taken on the line 40—40 of FIG. 39;

FIG. 41 is a top plan view of apparatus representing a seventh embodiment of the invention;

FIG. 42 is a side-sectional view taken approximately in the vertical plane of line 42—42 of FIG. 41;

FIG. 43 is a transverse sectional view through one of the track rails and is taken approximately in the vertical plane of line 43—43 of FIG. 41;

FIG. 44 is a transverse sectional view through one of the test rails and is taken approximately in the vertical plane of line 44—44 of FIG. 41;

FIG. 45 is an enlarged fragmentary top plan view of a transfer block and the adjoining ends of the track and test rails shown in FIG. 41;

FIGS. 46 and 47 are end views of the adjacent end faces of the test rail and transfer block as viewed along the lines 46—46 and 47—47, respectively, of FIG. 45;

FIGS. 48 and 49 are enlarged longitudinal and transverse sectional views taken through one of the bearing pod assemblies shown in FIG. 41, with the other bearing pods being of identical construction;

FIG. 50 is a plan detail view of a slotted roller retainer ring employed in each bearing pod assembly shown in FIGS. 48 and 49;

FIG. 51 is a simplified wiring diagram of the control circuit of the embodiment shown in FIGS. 41–50;

FIG. 52 is a top plan view of apparatus representing an eighth and preferred embodiment of the invention;

FIG. 53 is a side-elevational view of the apparatus of FIG. 52 with portions of the bearing pod assemblies broken away and sectioned;

FIG. 54 is a transverse sectional view through one of the test rails and is taken approximately in the vertical plane of line 54—54 of FIG. 52;

FIG. 55 is a transverse sectional view through the transfer block and transfer casting assembly of the embodiment of FIG. 52 and is taken approximately in the vertical plane of line 55—55 of FIG. 52;

FIG. 56 is a longitudinal sectional view through one of the field side bearing pod assemblies and is taken approximately in the vertical plane of line 56—56 of FIG. 55; and FIG. 57 is an enlarged fragmentary top plan view illustrating the mounting relationship of the transfer block and test rails.

Referring now to the drawings and particularly to FIG. 1, a portion of a car body 30 is shown with its wheels 31 riding on track rails 32. The car is supported from an axle 33 through the medium of conventional type journal boxes 34, and the axle integrally connects each opposed pair of wheels 31. The arrow 35 diagrammatically represents the journal friction existing between the bearing 36 of the journal box and the wheel axle 33 due to the car weight. It is this frictional force which becomes excessive when the lubricating action of the bearing deteriorates and ultimately produces the well-known hot box. In the case of a journal bearing which is functioning properly, the journal friction at the axle is approximately 21 pounds per ton and this force also appears, reduced in magnitude in accordance with the principle of translation of forces, between the car wheel and the track rail as a force of approximately 3.5 pounds per ton. There is, in addition, a force of approximately 2.5 pounds per ton imposed on the rail by the wheel due to the rolling friction therebetween. Thus, the total drag force exerted on the rail by the car wheel in the case of a properly functioning journal bearing is approximately 6 pounds per ton and is indicated diagrammatically by the arrow 37. This drag force is not materially affected by the car speed.

It should be noted that the absolute weight and drag forces imposed on each rail by each wheel may differ in the case of each wheel due to dynamic unbalances in the mechanical system; however, it is the ratio which is the critical factor and this is controlled by the bearing condition. The drag-to-weight ratio remains substantially constant for a given bearing irrespective of the dynamic unbalances.

The deterioration of journal bearings is a gradual process and the drag-to-weight ratio increases proportionally as the deterioration proceeds. It has been found that ratios in the range of 10 to 15 pounds per ton usually reflect the existence of an incipient bad bearing condition. This value, however, represents the average ratio for an axle as it is not possible to isolate for independent determination the forces generated at each of the two bearings associated with a particular axle. In the winter months, the colder temperatures carry the heat away from the bearing more efficiently and drag-to-weight ratios are therefore generally lower in the winter than in the summer. Such ambient conditions should be taken into account in selecting a maximum allowable drag-to-weight ratio.

The ultimate value for a drag-to-weight ratio which is selected as being too high and which, therefore, is to be detected is to some extent a matter of choice. Of course, the higher the drag-to-weight ratio which is permitted, the more the danger of developing a hotbox and causing a bearing failure. It is not the purpose of the present invention to define precisely what drag-to-weight ratios should be investigated, as this is dependent upon the policy of the safety and maintenance program of each railroad.

Various forms of apparatus for determining the existence of a bad bearing condition are disclosed herein, and they may be divided into two separate categories. In the case of either category, however, the apparatus is arranged to react to the drag-to-weight ratio imposed on the rails by each pair of wheels. If the actual drag-to-weight ratio is greater than a predetermined allowable ratio, suitable means for controlling a paint spray can or other devices are actuated and an indication is produced.

In the first category, the devices are provided with a built-in stability corresponding to a predetermined drag-to-weight ratio. This is accomplished by causing a selected portion of the weight acting on the rails to be directed in opposition to the forces of drag. Thus no movement in response to the drag forces is possible unless they exceed the prescribed amount. When such movement does occur, it is made to actuate suitable indicating devices.

In the other category, the devices make independent determinations of the drag and weight forces, and these factors are fed into a suitable computing device which computes the drag-to-weight ratio of the measured forces and compares this ratio with a predetermined value. Preferably electrical means are employed for the computations involved.

It should be understood that the apparatus of the present invention is installed in both track rails for simultaneous determination of the drag and weight forces imposed by each wheel of a wheel pair. By this means, a composite value is arrived at for each wheel pair. As mentioned previously, each wheel pair is carried by an integral axle and functions as a unit. For this reason, it is proper to base the determination of the journal bearing condition upon the composite drag-to-weight ratio of each wheel pair when functioning as a unit. In practice, however, certain forms of the invention permit the opposed rail portions to act independently of one another but the drag and weight effects are combined.

A first embodiment, as illustrated in FIGS. 2 to 7, is of the mechanical built-in stability type and is arranged to utilize a hydraulic system for producing stabilizing action. As shown in FIGS. 2 and 3, each track rail 32 is interrupted for a short distance for the reception of the novel detecting apparatus, designated generally as 38. In this embodiment, the mechanical apparatus for each track rail functions independently and the results for each rail are combined.

For convenience only one rail need be considered and its associated apparatus consists of a sliding rail section 39 mounted for relative sliding movement within a beam structure 40. The beam structure 40 is fixedly mounted relative to the cross ties 41 and consists of a pair of channel-shaped members 42 arranged in spaced apart back-to-back relationship as shown in FIGS. 4, 5 and 6, that merge at their forward ends with the upper regions of a main housing 43. The main housing comprises a cylindrical housing 44 forming a chamber 45 for the reception of a cylindrical ram member 46, and an upper housing 47 that surrounds the front support structure 48 for the sliding rail 39. This structure rides upon the ram and transmits the weight forces from the rail 39 to the ram.

The front supporting facilities are best shown in FIG. 7 wherein the support structure is illustrated as being formed with transversely spaced opposed sockets 49 for the reception of a cooperating pair of rollers 50 that are rotatably carried at the reduced ends of a support shaft 51. The support shaft is passed through an elongated opening 52 formed in the forward end of the beam (see FIG. 3).

At its rear end, the channel-shaped beam structure is formed with a set of transversely spaced opposed sockets 53 for the reception of a pair of rollers, not shown, that are rotatably carried on the reduced ends of a supporting shaft 54. The shaft 54 is passed through an elongated openings 55 formed in the rear end of the beam. Thus, the rail 39 is supported at its rear end by a shaft 54 that is carried by rollers that are fixedly mounted in the beam structure and is supported at its front end by a shaft 51 that is carried by rollers mounted in a vertically movable supporting structure 48 which is carried by and moves with the main weight supporting ram 46. The rail engages the shafts through the horizontally elongated slots 52 and 55 and thus is capable of limited sliding movement relative to the beam structure.

It may be seen that with this construction the weight on the sliding rail is supported by the fixed roller shaft 54 and the hydraulic ram 46 in a proportion determined by the position of the wheel on the rail as in a simple beam. As respects the hydraulic ram, the weight that is supported thereby varies from zero pounds when the wheel is over the fixed roller to the total weight when the wheel is directly over the ram. During this travel of the wheel relative to the rail, the drag force exerted by the wheel on the rail remains substantially constant.

Operatively connected to the hydraulic ram 46 by an interior oil passage 57 is a second and smaller hydraulic ram 58 located so as to impose a retarding force upon an abutment 59 depending from the sliding rail 39 and this retarding force acts in opposition to the drag force imposed upon the sliding rail due to bearing friction.

An oil supply 60 is maintained in the forward compartment of a control box 61, as shown in FIG. 7, and is adapted to replenish the fluid in the ram cylinder 45, ram passages 57, and the connecting passages 62 and 63 should there be any leakage.

In the particular construction illustrated, it may be seen that when the car wheel first rolls onto the sliding rail, its weight acts to the left of the fixed roller shaft 54 as viewed in FIG. 3 and therefore tends to lift the ram 46 out of its cylinder 45. This is prevented by a split ring 64

FIG. 7, that is secured to the top of the cylinder housing 44 and that is of slightly smaller inside diameter. The split ring 64 thus abuts with the upwardly facing shoulder 65 of the ram and prevents withdrawal thereof. This split ring may also be grooved in its inner peripheral wall for the reception of a neoprene O ring 66. As illustrated in FIGS. 3 and 7, it is also preferred to provide a spring 67 in the bottom of the cylinder housing to counterbalance the weight of the ram and supporting structure and thereby reduce this source of error.

When the wheel first moves onto the rear end of the sliding rail, since the weight on the hydraulic ram is initially zero, there is no pressure in the hydraulic fluid and thus the retarding force exerted by the small ram is zero. As the wheel progresses over the rail, the hydraulic pressure builds up and the retarding force exerted by the small ram 58 exerts a proportionally increasing force against the depending abutment 59 of the rail. The exact value of the retarding force is determined by the component of weight imposed on the large ram and by the ratio of the areas of the small and large rams.

The sliding rail is normally prevented from moving relative to its supporting structure by the interengaging action of locking facilities, shown in FIG. 4, that are carried therebetween and that are adapted to be disengaged by the action of the car wheel. The locking facilities utilize a lock bar 68 that is mounted on the sliding rail 39 for relative vertical sliding movement and that is urged upwardly by a suitable coil spring 69 carried in the sliding rail. The lock bar 68 is limited in its upward movement by the engagement of a laterally extending finger 70 with a downwardly facing shoulder portion 71 of the rail. Similarly, one of the channel-shaped beam members 42 is provided with a laterally projecting stop pin 72 that in normal usage is adapted to abut against a portion of the lock bar and block relative sliding movement between the rail and the beam structure. In the presence of a car wheel, however, the locking bar is depressed against the action of the spring as shown in FIG. 4 until a slotted region thereof comes in register with the stop pin 72 and permits relative sliding movement. The locking facilities are located inwardly a certain distance along the rail section, as indicated in FIG. 2.

The particular location chosen for the rail lock secures the parts in fixed relationship while the car wheels transfer from the regular rails to the sliding rails and appreciable rail movement and accompanying shock effects are avoided by selecting a location such that the drag and stabilizing forces are of comparable magnitudes.

If, at the time that the wheel passes over the locking bar, the drag force on the sliding rail due to the bearing friction is greater than the retarding force, the rail will move forward to permit the contacts in a first switch 73 to close.

The switch 73, as best seen in FIG. 5, is mounted on one of the channel-shaped beam members with its operating arm in abutting relationship with an actuating rod 74 carried by the sliding rail. For ease of access the switch 73 is mounted externally and the rod 74 projects through an elongated slot 75 formed in the beam structure. The arrangement is such that the rod 74 normally maintains the switch contacts in open position but when the rail slides forward, these contacts close.

The rail will remain in a forward position until the force from the smaller ram becomes greater than the drag force at which time the rail is returned to its original position. A second switch 76 is provided, as shown in FIG. 6, and is constructed such that when a wheel passes by, its tread deflects a lever 77 and causes the contacts 78 of this second switch to close. The switch 76 is secured to an overhanging flange portion of one of the channel-shaped beam members 42 by a fixed jaw 79 and a releasable bolt 80. Thus the switch 76 is readily removable and is adapted to be secured anywhere along the beam member 42.

Each sliding rail is provided with a rail lock and a switch 73, however, only one wheel-actuated switch 76 is necessary. The rail switches 73 and wheel switch 76 are arranged in series in the electrical circuit of FIG. 7A and the arrangement is such that if both rails move forwardly when the rail locks are momentarily disengaged and if both rails are maintained in a forward position until the wheel actuates the switch 76 then for the instant when the wheel tread depresses the lever 77 the contacts of all of the switches will be closed simultaneously to pass an electrical impulse to a suitable control relay 81. The electrical impulse acting through the control relay 81 actuates a solenoid valve 82 to release a spray from a pressurized container 83, see FIG. 7.

It should be apparent that axles carrying wheel pairs of unequal diameter will exert a disturbing influence on the various switch actuations since the rail associated with the smaller wheel will be urged forwardly relative to the other rail. In extreme cases of widely varying wheel diameters and/or borderline drag-to-weight ratios, inaccuracies can occur with this arrangement.

The indicating spray may preferably take the form of a spray chalk solution in a soluble paint or suitable medium directed onto the journal box from a control box. Other means may be used such as an arrangement for sending a signal to the locomotive cab or an outside visual indicator set down the track from the device.

Since the returning force exerted by the small ram 58 increases as the wheel progresses along the sliding rail the location of the second switch 76 may be correlated with the ratio of the areas of the small and large rams to cause the device to discriminate between various drag-to-weight ratios and to mark only those ratios that exceed a predetermined value.

A second embodiment for detecting hotboxes is illustrated in FIGS. 8 to 14 and is based on the system of directly and independently measuring the drag and weight forces and subsequently computing the drag-to-weight ratio by means of an electric ratio discriminator that also compares the computed drag-to-weight ratio with a predetermined maximum allowable value for this ratio. This arrangement as in the case of the first device utilizes trackside installed apparatus and the rails 32 are interrupted for a short distance in order to accommodate the device. The interrupted rails are maintained suitably spaced apart by elongated braces 98 suitably secured to the railroad ties as indicated at 99.

As shown in FIGS. 9 and 12 particularly, the device utilizes an arched rail casting 100 the top of which, as indicated at 101, serves as a portion of the track rail. The arched portion 102 of the rail casting is mounted on a base casting 103 through the medium of a pair of shafts 104 and 105 and their associated sleeve bearings, designated 106 and 107, respectively. The base casting 103 has a narrow lower portion 108 that fits snugly between the adjacent wooden ties 42 and is itself supported by the ties. The upper portion 110 of the base casting spans out longitudinally in opposite directions and extends upwardly to form a pair of trunnions 111 and 112 for the reception of the shafts 104 and 105.

Referring specifically to FIG. 9, the righthand shaft 105 is fixedly secured to the right-hand trunnion 112 of the base casting by means of a pin 113 extending completely therethrough. The rail casting is provided with a pair of trunnions 114 that carry the sleeve bearings 107 that are adapted to telescope over the ends of the right-hand shaft 105. The left-hand shaft 104, on the other hand, is secured to the rail casting 100 by means of a plurality of screws 115 and its is carried by a separate pair of trunnions 116 formed on the rail casting. The left-hand shaft cooperates with the bearing sleeve 106 carried by the left-hand trunnion 111 of the base casting 108. It will be noted that the arrangement of the bearing sleeves and the shafts allows a limited amount of relative longitudinal travel between the rail casting and the base casting.

Between the two shafts there is located a suitable load cell 117 that is fastened to each of the shafts 104 and 105 so that longitudinal forces imposed on the rail casting will cause similar forces to be applied to the load cell. A portion of the right-hand shaft 105 is hollowed out for the reception of a headed bolt 118 that is secured to the load cell 117 and assists in its support. A portion of the left-hand shaft 104 is hollowed out, as indicated at 119 in FIG. 10, in order to accommodate an overload spring mechanism which cooperates with the shaft to support the load cell and to prevent the imposition of excessive loads on the cell.

The hollowed out portion 119 is of stepped construction to define a pair of different-diameter cylindrical bores separated by an annular shoulder 120. The spring mechanism comprises a stepped tubular insert 121 formed with an annular shoulder 122 that serves as a spring seat for a helical spring 123 that is telescopically received over the narrow-diameter end of the insert. The insert 121 is threaded for the reception of a retaining nut assembly 109 that may be tightened to compress the spring and provide the desired degree of preloading. A headed bolt 124 extends completely through a central longitudinal bore in the insert for connection to the operating rod 125 of the load cell 117.

The spring mechanism is inserted in the hollowed out portion 119 until the helical spring 123 abuts against the annular shoulder 120 and it is held in proper position therein by a threaded guiding sleeve 126. The guiding sleeve 126 is fixed in position by a lock ring 127.

When the drag force urges the rail casting forwardly along the indicated direction of travel, the shoulder 120 transmits this force through the preloaded spring 123, to the spring seat 122, and finally to the drag load cell 117. The spring may be preloaded to the maximum capacity of the cell for transmitting all loads not exceeding this capacity. For higher loads, the spring mechanism yields and allows the rail casting to slide relative to the base casting and after a limited amount of such travel solid contact is established therebetween for positively preventing any further movement.

It may be seen that the rail casting 100 is capable of pivotal movement relative to the base casting 103 about the longitudinal center line of the shafts 104 and 105 and this arrangement is utilized in determining the weight load imposed upon the rail 101 by the car wheel. As is best seen in the plan view of FIG. 11, the line of contact 129 of the wheel on the rail casting is offset transversely from the center line of the supporting shafts 104 and 105. This results in the rail casting pivoting or rocking about the shaft centerline when a vertical load is applied to the rail. A weight load cell 130 is arranged directly under the line of contact of the rail and preferably is disposed midway along the length of the rail casting 100. This weight cell is mounted within a hollowed out portion 131 of the base casting, as shown in FIG. 12, and is provided with ball and socket joints 132 and 133 at its top and bottom support points in order to allow for the pivotal movement of the rail casting.

Each of the load cells is a commercially available strain gauge type of device and includes an electrical resistance element bonded to the side of a steel column provided within the cell. The resistance element forms one leg of a Wheatstone bridge-type circuit that is built into the strain gauge and an alternating current is fed to this circuit in such a manner that no output voltage is produced when the system is in balance. When the steel columns within each of the cells are subjected to tension or compression loads, the strain gauges produce an output voltage having a magnitude and polarity representative of the load imposed.

As a car approaches this form of hotbox detector and the wheel rolls over the rail casting 100, the wheel imposes a drag force on the rail casting and urges it forwardly in the direction of travel. The drag force is transmitted to the drag load cell 117 which produces an output voltage in the Wheatstone bridge circuit that is representative of the drag. Simultaneously, the weight force imposed on the rail casting by the wheel is transmitted directly to the weight load cell to produce a representative output voltage. The ratio discriminator 136 automatically computes the measured drag-to-weight ratio and compares it with the predetermined maximum allowable ratio. If the measured ratio is excessive, a suitable indication is made by the paint sprayers 145.

In order to obtain a composite drag-to-weight ratio for a given wheel pair the drag cells and weight cells associated with each test rail are combined to produce an average "weight voltage" and an average "drag voltage." The electrical circuit for comparing the measured drag and weight values with a predetermined maximum allowable drag-to-weight ratio is herein called a ratio discriminator designated generally as 136 and located in the control box 148 of FIG. 13. The ratio discriminator is illustrated in detail in FIG. 14 wherein numeral 137 indicates the combined weight cells of the device and numeral 138 indicates the combined drag cells. It will be noted that the load cell arrangements are, in effect, generators producing output voltages in proportion to the loads applied thereto. As indicated, the weight cells 137 are arranged in the ratio discriminator circuit in reversed polarity relative to the drag cells 138, and they are connected together by a resistance network comprising a fixed resistor 139 and a tapped resistor or potentiometer 140. By appropriately positioning the tap arm 141 along the resistor 140, the maximum allowable drag-to-weight may be varied as desired. Then an increase in weight produces a signal of one polarity at the tap arm 141 whereas an increase in drag produces a signal of opposite polarity.

Signals produced in the ratio discriminator resistance network are fed to a suitable amplifier 142 which builds up the relatively weak signals to permit proper sensitivity. A gated limiter and wave shaper section 143 clips the peaks off the wave forms produced by the amplifier 142 and presents a series of uniform waves to a phase discriminator section 144. The arrangement is such that signals produced by the weight cell arrangement 137 will not operate the phase discriminator whereas even extremely small signals produced by the drag cell arrangement 138 will operate the discriminator. In actual operation the weight and drag cell arrangements tend to balance each other out, and so long as the weight cell voltage predominates or the voltages are equal, no indications will be made. However, as soon as the drag cell voltages predominate, the phase discriminator section 144 becomes operative to actuate a relay-controlled paint sprayer 145. In the present arrangement a pair of paint sprayers are employed, and they are supplied from a spray tank 146 through suitable couplings indicated as 147 in FIG. 13.

The conduits 149 and 150 carry the electrical wires wires 151 and 152 that connect the ratio discriminator with the weight cells and drag cells, respectively.

As illustrated in FIGURE 14, indicating meters 137M and 138M, respectively, are connected to make separate readings of the composite weight loads and the composite drag loads. These meters were also connected by means of switches 137S and 138S to make separate readings of the weight and drag loads individual to each rail; and where a car having wheels of unequal diameter is inspected, a negative drag force on one of the rails has actually been measured.

It may be seen by referring to FIG. 11 that as a wheel rides over the movable rail casting 100 it acts generally along the line of contact 129 and imposes an eccentric load on the support points (namely, sleeves 104 and 105 and weight cell 130) for the rail casting except for the brief increment of travel when the wheel is directly over the weight cell. Therefore, the most accurate readings are those corresponding to the time when the wheel is over the weight cell 130.

It should be understood that the actual weight load applied to weight cell 130 is constant irrespective of the position of the car wheel on the rail casting and it is only the different friction effects resulting when the car wheel is at an eccentric loading point which lessen the accuracy of the reading at such a point.

It should be appreciated that wherever there is a friction force resisting relative longitudinal movement between the sliding rail and its supporting structure, the measurable effect of the drag is correspondingly reduced. In the preceding arrangement the sleeve type bearings introduce a significant amount of frictional resistance and, in effect, constitute a source of error. Much of this error due to friction can be eliminated by using rollers.

Figure 10:
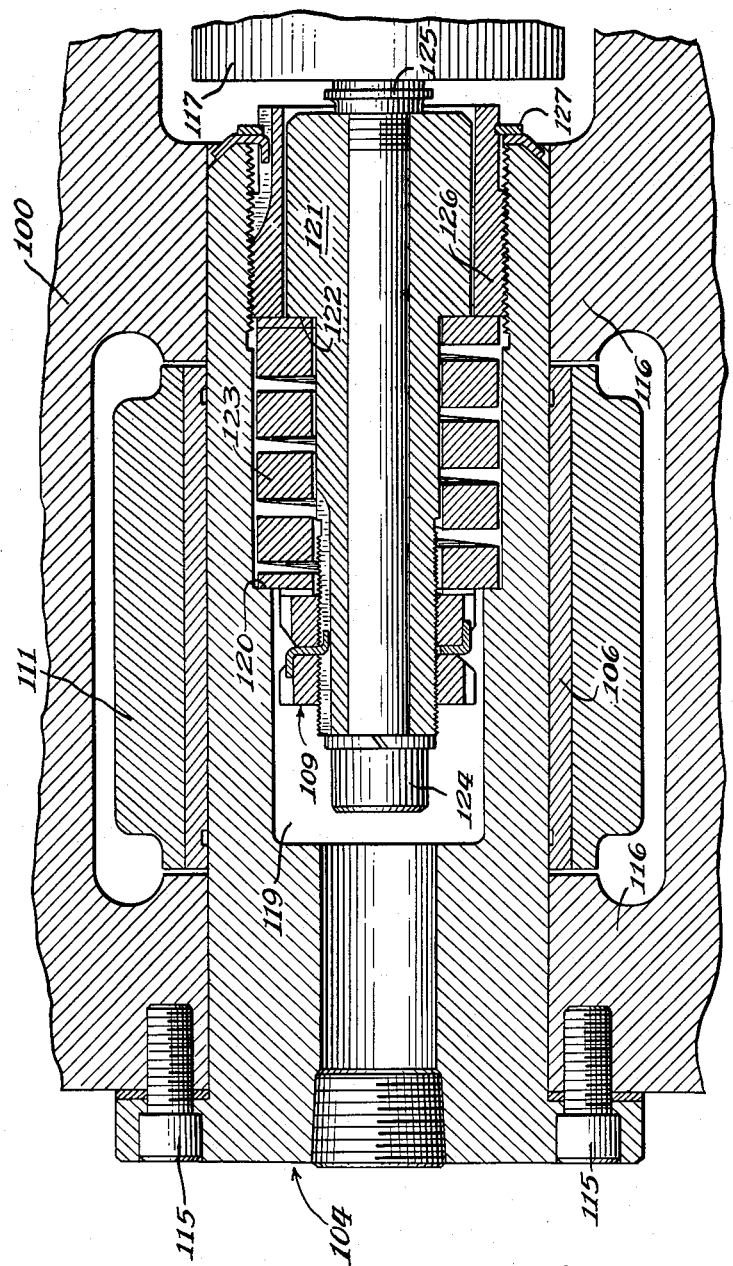
FIG. 10 is an enlarged sectional view of an overload spring mechanism for applying the drag forces to a drag-detecting cell.
Figure 15:
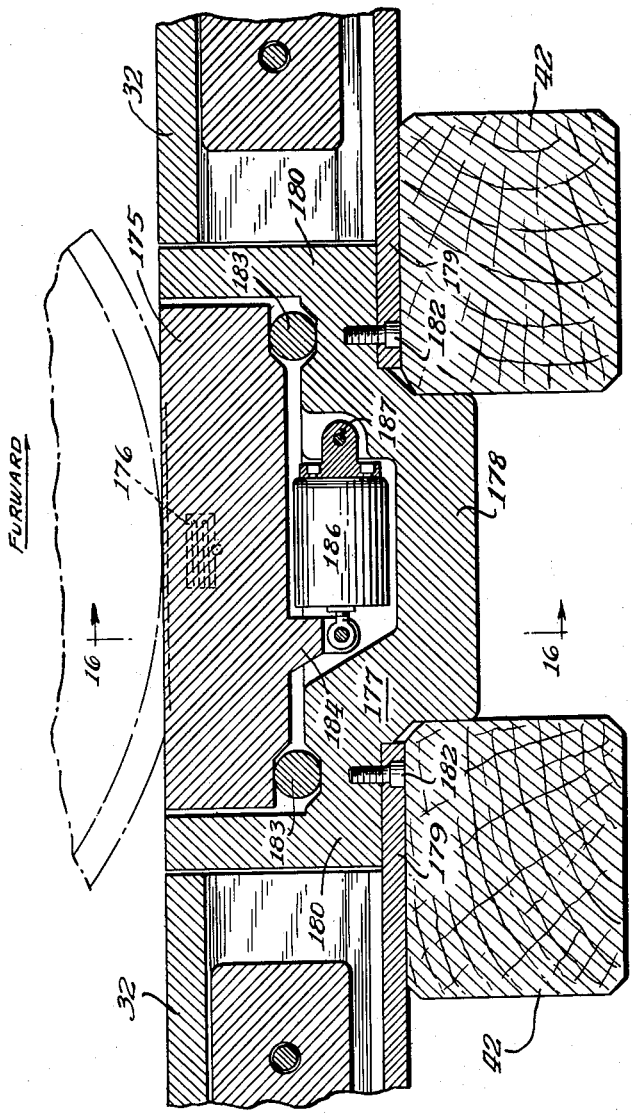
FIG. 15 is a side sectional view of a modification of the embodiment of FIGS. 8–13.

In FIGS. 15 and 16, a variation of the previous device is shown in which rollers are employed to materially reduce adverse friction effects. The principal difference resides in the fact that the weight load cell has been eliminated and the overall component parts have been considerably simplified.

A sliding rail 175 is arranged to serve as a bending beam and is provided centrally thereof with a suitably calibrated strain gauge element 176. The base casting 177 has a narrow lower portion 178 snugly fitted between adjacent ties 42 of the trackway and spans out longitudinally in opposite directions to form shoulder portions 180 that rest upon mounting plates 179 that are fixed to the base casting and secured in place by means of suitable screws 182. The shoulder portions 180 of the base casting extend up to the rail surface and actually form portions of the rail. The base casting is notched to receive cylindrical rollers 183 at each end to support the rail casting or beam 175 for relatively frictionless movement thereon.

At an intermediate point, the rail casting is formed with a depending shoulder portion 184 adapted for pivotal connection to an operating rod 185 of a drag cell 186. The drag cell in turn is pivotally mounted on the base casting as indicated at 187. The pivotal mounting of the drag cell accommodates the deflections of the shoulder 184 of the beam-like rail casting such as occur due to the bending beam action.

When a wheel rolls onto the beam 175, it produces a bending thereof and varies the resistance of the strain gauge element 176 bonded to the side of the beam. It will be noted that the bending of the beam is greatest at the time that the wheel is directly over the center of the beam and that therefore the true weight is determined at this time. The beam is movably mounted on the base casting and is capable of limited longitudinal movement relative thereto. Thus, when the beam is subjected to a drag force along the direction of the rails, it transmits this drag force to the drag cell 186 which is disposed parallel with the rails.

The electrical wiring 151 and 152 for the weight and drag measuring elements, respectively, is located within a conduit 190 that is supported by a bracket 191 suitably secured to the base casting, as shown in FIG. 16. In this embodiment, the base casting is conformed to the contour of the rail-shaped bending beam and when necessary exerts a desirable guiding action thereon. The strain elements may be utilized in a manner similar to that described in connection with the previous embodiment in order to arrive at a determination of the drag-to-weight ratio and in order to determine whether the predetermined maximum permissible ratio has been exceeded.

It should be noted that all movement of the sliding rails or beams 175 is resisted by a drag cell 186 and due to this fact, a considerable shock effect will appear in the measured results. This shock occurs as the wheels roll onto the rail casting and may in certain cases set up such severe vibrations as to totally obscure the desired determination.

In addition, the presence of unequal wheel diameters produces oppositely directed longitudinal forces on the pairs of rail castings for the forms shown in FIGS. 8 to 16 so that one drag cell reads excessively high and the other drag cell excessively low or negative. Such an unbalance can be compensated in the electrical circuitry; however, it is not the most advantageous arrangement. Certain shock effects are also occasioned by wheel pairs of unequal diameter since the rail casting is not free to move to allow for this.

The third embodiment, as shown in FIGS. 17 to 26, is of the mechanical built-in stability type and utilizes an inclined plane. The angle of incline determines the value of the drag-to-weight ratios which will be detected.

A force diagram is shown in FIG. 26 to illustrate the principle of the inclined plane as applied to the determination of drag-to-weight ratios. The vector W represents the weight imposed on the movable rail R which has an inclined lower surface supported on the inclined upper surface of a base support B. The angle of the incline is designated A. The vector D represents the drag imposed on the movable rail and due to the action of the inclined plane a vector S acts on the movable rail in opposition to the drag D. The vector S is produced by the reaction of the inclined plane arrangement to the vertical weight force and is calculated from the equation $S = W \tan A$.

The inclined plane prevents any longitudinal movement of the rail casting unless the drag-to-weight ratio imposed by the car wheel exceeds the value of the ratio represented by the angle of incline or, in other words, unless the drag D exceeds the stabilizing force S. The angle of incline is selected to correspond to a predetermined maximum permissible drag-to-weight ratio and therefore is usually less than 1°. Since the value that is considered permissible is to some extent a matter of choice, this figure is given merely as a representative example.

As shown in FIG. 17, each of the rails 32 is interrupted for a short distance to accommodate the device, designated generally as 200, and the rails are maintained suitably spaced apart by elongated braces 201 secured to the ties 42 by suitable fastening means 203.

For each rail a base casting 204, as shown in FIG. 18, is provided that is supported on adjacent ties 42 and includes a narrowed center portion 205 that fits snugly between the ties. The base casting includes upwardly extending arms 206 that form a portion of the rail surface and centrally thereof is formed with a concave supporting surface 207 that is adapted to receive a segment 208 having a complementary convex surface 209 on its lower side and a flat upper supporting surface 210. The upper supporting surface receives a series of closely spaced cylindrical rods or roller elements 211 which in turn support an oppositely disposed segment 212 having a substantially flat lower surface 213 for cooperation with the rollers and having a convex upper surface 214 for cooperation with a concave portion 215 of the movable rail casting 216. The frictional resistance to movement of the rail casting which subtracts from the detectable drag force is held to a minimum by the use of roller elements 211.

The lower segment 208 is seated in the base casting and is fixed at any desired angle of incline by appropriately adjusting the screws 217 and 218 disposed in suitable longitudinal bores formed in the base casting. The upper segment is fixed to the rail casting by a plurality of countersunk screws 219 and provision is made for adjusting the relative positioning of these two parts to maintain the surface of the rail casting parallel with the track rails irrespective of the angle of incline of the lower segments 208.

At its rear end the base casting carries an additional longitudinally extending screw 220 that is adapted to abut against the rear end of the upper segment and limit all rearward movement. Disposed rearwardly of the rail casting is a switch 221 that may be mounted in the rearward arm 206 of the base casting. The switch 221 has a projecting arm 222 that closes a pair of contacts in response to a forward movement of the rail casting and the arrangement is such that the contacts of switch 221 are normally open but are closed when the rail casting moves forwardly to release the arm 222.

Relative lateral movement between the rail casting and base casting is prevented by a pair of rollers 224 that are carried by the upper segment 212 for rotation about an axis normal to the inclined plane. These rollers are adapted to contact opposed guide portions 225 (see FIG. 20) that are attached to the lower segment 208 by suitable screws.

A wheel, in rolling across the device, is first supported directly by the rearward arm of the base casting, and as the wheel continues, this load is transferred to the sliding rail 216. The load is again transferred to the base casting as the wheel leaves the device.

When a wheel rolls onto the sliding rail, it exerts a drag that tends to move the rail in the direction of travel; however, it also imposes a vertical weight force on the rail which, due to the action of the inclined plane arrangement, is directed oppositely of the drag. Assuming that the force due to drag is less than the opposing force created by the inclined plane, the rail will remain in its rearward position as shown. If, however, the drag force exceeds the stabilizing force, the rail will move forward, thereby releasing the arm 222 and permitting switch 221 to close and energize an indicating device that is preferably mounted in a control box 226 (FIG. 17).

It is assumed that there may be a shock effect as the car wheel first engages the movable rail casting; however, this does not result in an unwarranted forward movement thereof since the weight of the car as transmitted by the wheel provides a desirable damping effect. The only critical problem is whether the impact erroneously produces a switch actuation and since the damping action of the car weight prevents this, there is no error introduced in this arrangement due to shock.

The inclined plane arrangement finds particular application to cases wherein the individual wheels of any wheel pair are of unequal diameter. It will be remembered that wheels of unequal diameter tend to produce relative movement between the movable rails. In the present arrangement, however, the movable rails are blocked against rearward movement by abutment with the screws 220 and the effect of unequal wheel diameters is completely accommodated by allowing forward movement of the rail associated with the smaller wheel. Sufficient clearance between the forward end of each movable rail and the adjacent upwardly extending arm 206 of the base casting must be provided in order to accommodate the necessary movement. Such movement of the rail casting associated with the smaller wheel permits the associated switch 221 to close, but the other switch 221 remains open.

The two switches 221 and a rail switch 227, located at an intermediate point along the rail and adapted to be actuated by the car wheel, are connected in series, as indicated in FIG. 24, for energizing a relay 228 having a normally open contact 229 for controlling the energization of a solenoid 230. The solenoid 230 controls a valve for releasing a spray of paint. It should be apparent that the presence of unequal wheel diameters cannot cause an actuation of the control valve since only one of the switches 221 will be closed.

In the event, however, that the drag force exceeds the stabilizing force generated by the inclined plane arrangement, both of the switches 221 will be closed and an actuation of the control valve will occur at the moment that the wheel passes over the rail switch 227.

A control box 233 for the above is illustrated in FIGS. 21, 22 and 23 and contains a power supply 234 for the electrical circuit of FIG. 24, a pair of solenoid-actuated paint sprayers 235, and a pressurized container 236 for the spray solution. The power supply is preferably provided with a suitable on-off switch 237 and it includes a pair of lead wires 238 and 239 which are connected to the rail switch and relay circuit of FIG. 24. The paint sprayers 235 are controlled by solenoids 230 mounted directly thereon, and these solenoids are connected to the power supply by suitable electrical wires contained within the conduits 240 and 241. The spray container 236 is provided with a suitable hand relief valve 243 and feeds the paint sprayers through a T coupling 244 and the spray conduits 245 and 246. A vertically reciprocable armature 248 is disposed within the solenoid coil 230 and actuates a needle-nosed valve rod 249 through an intermediate link 250.

When the solenoid is energized, its armature 248 is moved upwardly and retracts the valve rod 249 to establish an outlet passage for the spray. The port 251 is inclined upwardly to direct the spray onto the railway car journal box.

It should be understood that other forms of indicating devices may readily be employed without departing from the spirit of the present invention.

In FIG. 25, a modified inclined plane apparatus is illustrated, and this arrangement permits the movable rail casting and the base casting to be considerably simplified.

A base casting 256 is mounted on suitable plates 257 which are provided on adjacent ties 42 and has a narrowed center portion 258 that fits snugly between the ties. The base casting spans out longitudinally in opposite directions to form an upwardly extending rear arm 259 and front arm 260 that serve to transfer the car wheels from the regular rails 32 to the movable rail casting 262.

The base casting is provided with a pair of longitudinally spaced arcuate cutouts 263 that receive similarly shaped segmental inserts 264 that preferably are adjustably mounted therein.

Similarly, the rail casting is provided with a pair of longitudinally spaced arcuate cutouts 265 that are adapted to receive segmental inserts 266 which also are preferably adjustably mounted within the cutouts. Each of the inserts is provided with a flat face adapted for contact with elongated rollers 268 and 269. The rollers support the rail casting for movement relative to the base casting, and the angle of incline is regulated by appropriately positioning the segments 264 and 266. Any suitable means may be provided for carrying out the segment adjustments. In all cases, however, the segments must be positioned identically since the device should have only one angle of incline at any given instant.

The rear arm 259 of the base casting is provided with a forwardly projecting shoulder 269 that prevents rearward movement of the rail casting 262. In addition, the rear arm 259 is hollowed out to provide a mounting for a switch 270 that is normally maintained open when the rail casting is in its rearward position and is in contact with the operating arm 271 of the switch 270. Upon forward movement of the rail casting, the arm 271 which is spring loaded is permitted to advance and cause the contacts of switch 270 to close.

In all operative respects the device of FIG. 25 is similar to that shown in FIGS. 17 to 23 and it utilizes identical electrical control circuits for producing the desired indications.

A further embodiment is shown in FIGS. 27 to 30 and it also is specifically applicable to the determination of drag-to-weight ratios of car wheels which are of unequal diameter. This device has a built-in stability of a predetermined degree determined in accordance with the inclined plane principle. The principal features of this embodiment are the equalizer bar, best shown in FIG. 30, and the pendulous suspension for one end of the movable rail casting, shown in FIGS. 28 and 29.

Referring now to the plan view of FIG. 30, it may be seen that the base support includes a single rectangular plate 300 that spans three railroad ties 42 and serves as a base casting for both of the movable rail portions 302. The base plate, of course, is rigidly secured to the ties by suitable fasteners 303 and has provision for mounting an equalizer bar 304 midway between the parallel rails for pivotal movement about a vertical axis. In this arrangement each movable rail or beam 302 is supported on one end by a pair of rollers 305 that are mounted on roller bearings carried by a shaft 306 that is rigidly secured to the beam structure. Thus, the rollers 305 are carried by the beam for wheeled engagement with the base plates. For this purpose, the base plate is provided with suitably disposed roller pads 307 (FIG. 27).

At the opposite end, each beam is supported by means of a pendulous suspension. The base plate is cut out, as at 308, adjacent the end of each movable rail to receive a tube 309 that is inclined slightly from the vertical mounted on a set of rollers 310 adapted for wheeled engagement with roller pads 311 provided on the top surface of the base casting. This arrangement is substantially similar to the roller arrangement employed at the other end of the movable beam and includes a shaft 312 of reduced section at its central region and having roller bearings 313 at each end for rotatably receiving the rollers 310.

As best shown in FIG. 28 the vertical tube 309 is pivotally suspended from its supporting shaft 312 for swinging motion longitudinally of the rail. Relatively frictionless bearing facilities are provided, as at 314, to facilitate this swinging movement. The lower portion of the tube is provided with opposed sockets 316 for the reception of roller bearings 317 that rotatably support a shaft 318 fixedly carried by an integral depending shoulder portion 319 of the movable rail. Thus the movable rails 302 are pivotally mounted on the generally vertical tubes 309 which in turn are pendulously suspended from the movable rollers 310.

Each movable beam is provided with an elongated opening 320 adjacent its pendulously supported end and this opening is adapted to accommodate the roller shaft 312 from which the tube 309 is suspended as well as the end of the equalizer bar 304. A suitable link 321 and a pair of cooperating pins 322 secure the equalizer bar 304 to the reduced central section of roller shaft 312. The roller shaft 312 is connected to the movable beam by a pair of collars 323 that telescope over the shaft 312 for attachment to the opposite sides of the beam by means of suitable bolts 323B. These collars are of slightly larger inside diameter than the shaft 312 but are smaller than the link 321 and serve to limit relative lateral movement between the movable rail 302 and roller shaft 312 by abutting engagement with adjacent portions of the link 321. Longitudinal forces are transmitted directly between the roller shaft and the collars; however, the fact that the collars are slightly larger than the roller shaft permits a limited amount of relative longitudinal movement.

Since the opposite ends of the equalizer bar are rigidly connected to each set of rollers 310, it should be apparent that the sets of rollers are blocked against simultaneous movement in the same direction. However, the pivotal mounting of the equalizer bar does accommodate simultaneous movement in opposite directions. The various parts of the apparatus are constructed and arranged so that when assembled and positioned, as shown in FIG. 30, the generally vertical tube 309 is inclined slightly from the vertical as shown in FIGS. 27 and 29. The weight imposed on the movable rail by the car wheel acts through the eccentrically arranged pendulous suspension to set up a stabilizing force that resists longitudinal drag forces imposed on the movable rail.

The construction and arrangement of the various parts of the apparatus is such that the generally vertical tube 309 is inclined from the vertical and by reason of this a stabilizing force is set up that urges the beam rearwardly and thereby opposes drag force effects. When a wheel is supported on a sliding beam of this embodiment, its weight is distributed between the rollers 305 that are fixed on the beam and the rollers 310 of the pendulous suspension. However, the component of weight that acts upon the suspension sets up a stabilizing force due to the fact that the pendulous suspension is disposed at an angle to the vertical. It will be noted that as the wheel progresses over the rail, the force acting upon the suspension is at first a maximum and then decreases progressively to zero. Similarly the stabilizing force decreases proportionally until at some point the stabilizing force will equal the drag force.

To facilitate the passage of the car wheels from the regular rail portion onto the testing apparatus of FIGS. 27 to 30 and subsequently its passage from the testing apparatus to the regular rail a set of transfer blocks 325 are disposed between the rail ends and the ends of the sliding beam. The top surfaces of these blocks are contoured to conform to the contour of the surface of the rail head and at the end adjacent the beams they terminate in a beveled face, as at 326. The beam ends are each provided with a corresponding bevel face that runs parallel with the beveled face of the transfer block and these abutting faces are spaced apart to provide a suitable operating clearance for the sliding beams. In practice it has been found that a 1¼" clearance between each beam end and transfer block is sufficient. As best shown in FIGS. 27, 29 and 30, the transfer blocks overlap top and side surface portions of the sliding beams and thereby prevent the beam from moving sideways or from being displaced upwardly. The ends of the movable rails 302 are provided with rollers 327, as shown in FIG. 29, that are disposed in a horizontal plane and that fit between the laterally overlapping portions 325P (see FIG. 27) of the transfer blocks. As a further feature each of the blocks 325 is provided with a vertically arranged pin 328 that protrudes slightly above the surface level of the rail for actuation by a car wheel during approach of the testing apparatus. At its bottom end the pin is provided with a beveled face 329 that cooperates with a correspondingly beveled face formed on a longitudinally projecting portion of the sliding beams. These pins are actuated by a passing train wheel to recenter the beam 302 between the transfer blocks 325.

The pendulous suspensions are displaced at such an angle that they effect a righting force of approximately 350 pounds per ton when the wheel is directly over them. This force diminishes as the wheels progress along the beams, and finally, at a certain point on the beams, the righting force will have decreased until it is equal to or less than the drag force which is substantially constant. When this occurs, the beams move forwardly to swing the pendulum further from the vertical. Since both beams are moving in the same direction, unrestrained movement thereof is limited to the clearance between the collars 323 and the shaft 312. The roller support 310 for the tubes 309 in which the pendulous suspensions are provided are prevented during this action from moving forwardly due to the action of the interconnecting equalizer bar 304. Thus, when the drag force exceeds the built-in stabilizing force, the sliding beam will move forwardly relative to the tube 309 and produce a swinging movement of the pendulous suspension.

Electrical means are provided for indicating excessive drag-to-weight ratios and this may be of the same general type as shown in connection with the embodiment of FIGS. 2 to 7. Thus, a control box 338 is shown connected by conduits 330, 331 and 332 to a pair of electrical switches, 333 which is normally open and 334 which is normally closed. These switches are connected in series in the electrical control circuit and upon being simultaneously closed, a solenoid-controlled valve is opened to permit a suitable chalk or paint solution to be sprayed on the defective journal box.

Switch 333 is fixed to the sliding beam with its actuating arm 335 (FIG. 27) in engagement with a top portion of the generally vertical tube 309. In this position the actuating arm is confined and the switch contacts are open but when the beam moves forwardly carrying the switch with it and swinging the top of the tube rearwardly, the actuating arm is extended and the switch contacts close.

Switch 334 which is series connected with switch 333 is mounted on a bar 336 that is rigidly secured to the beam at a forward point, and this switch is adapted for actuation by the tread of the wheel as it passes over. If the force of the drag moves the beam forwardly before the second switch is actuated to its open position, both contacts will be closed and the spray device will mark the journal box. The positioning of the second switch may be varied in order to vary the drag-to-weight ratios which are to be indicated and the bar 336 has provision for such adjustment.

In the embodiment employing the pendulous suspensions, a separate indicating mechanism may be associated with each rail for independent operation or the switches associated with each rail may be arranged in a single circuit, and this is a matter of choice.

The arrangement of FIGS. 27 to 30 is specifically adapted to those cases wherein the pairs of wheels that roll across the device are of unequal diameter. It will be noted that in addition to the forward motion of the two sliding beams there is also taking place another simultaneous and independent motion of the beams. The larger of the pair of wheels, since it normally would travel a greater distance, imparts a rearward movement to the beam across which it travels. Similarly, the smaller wheel imparts a forward and equal movement to its beam, and the length of these movements corresponds to the difference between the circumference of the two wheels. The 1¼" spacing, mentioned previously, is believed to be adequate to allow for any such movements due to unequal wheel diameters and also accommodates the forward movement resulting from the drag force imposed upon the sliding beams.

In the case of the larger wheel, the motion imparted to the sliding beam causes the rollers that carry the pendulous support to move rearwardly along the the base plate but does not in any way change the angle of inclination of the pendulous suspension. Similarly, the rollers that carry the pendulous suspension associated with the smaller wheel will move forward. These movements are permitted due to the pivotal action of the equalizer bar and it should be noted that this arrangement introduces but a minimum of shock into the system. The reason for this is that the gaps between the sliding beams and transfer blocks are sufficient to accommodate all necessary movement. Therefore, the only force opposing the movement of the roller supports is the friction between the rollers and the base plate; this being quite small, the shocks are correspondingly small and do not seriously effect the ability of the device to determine drag-to-weight ratios.

Another embodiment is shown in FIGS. 31 to 34 and in this arrangement the drag and weight measurements are made directly and subsequently fed to a ratio computing and comparing device of the type shown in FIG. 14.

The base plate 400 extends over four of the railroad ties 42 and preferably a single base plate is employed for the pair of rails involved. The base plate is mounted on the ties and as shown has depending portions 402 that fit snugly between the outside pairs of ties to form a mounting chamber 403 for weight-detecting load cells 404. The sliding beam 405 is supported at each end on one of these load cells by means of an intermediate plate 406 and a series of closely spaced roller elements 407. The intermediate plates 406 are secured together in rigid relationship by a pair of cross beams 401 (see FIG. 31).

As shown in the plan sectional view of FIG. 34, the roller elements 407 have narrowed end portions 408 disposed within suitable confining apertures that are formed in a pair of side pieces 409 that extend substantially the entire length of the intermediate plate. The intermedate plates carry guide blocks 410 for cooperation with a pair of wheels 411 that are attached to the underside of the movable beam 405 for rotation about a vertical axis. The guide blocks 410 and wheels 411 eliminate any lateral misalignments of the movable beam.

In addition, the movable beam is provided with depending side walls 413 (see FIG. 34) that house the roller arrangement to shield it against undue contamination.

Transfer blocks 415 facilitate the passage of the car from the regular rail portions to the testing device, and they function in substantially the same manner as in the case of the previous embodiment. Each of the intermediate plates 406 (FIGS. 32 and 33) is formed with a double-ended hydraulic cylinder 416, the piston 417 for which is attached to and actuated by a depending shoulder portion 405S of the sliding beam. The sliding beam in the other rail is similarly constructed, and the opposite ends of the hydraulic cylinders disposed in the beams are connected by conduits 419 and 420 as shown in FIG. 31. One of these connecting hydraulic conduits is suitably tapped for connection to a fluid pressure cell 421. This fluid pressure cell is adapted to detect the drag force imposed upon the sliding beams by the wheel and the fluid pressure system transmits this force to the fluid pressure cell.

As the wheel rolls across the device, it will be noted that the load on the individual weight-detecting cells will vary; however, the sum of the load on the two cells in each rail remains constant and by using both cells for the determination of the weight it may be seen that the device is accurate throughout the time of passage of the wheels over the device. The drag imposed on the rail is transmitted to the hydraulic cylinders which in turn cause pressure to be built up in the fluid system and this pressure is sensed in the fluid load cell 421 (see FIG. 31) to produce an output voltage in direct proportion to the drag force.

The device is also particularly effective in minimizing the shock loads imposed by wheels of unequal diameters. As in the previous device, the larger wheel causes its beam 405 to move backwardly and the smaller wheel causes its beam 405 to move forwardly. As this takes place, fluid is merely displaced by one piston moving forwardly in the cylinder and the other piston moving correspondingly rearwardly in its cylinder, and the overall pressure to which the system is subjected remains the same and is proportional to the drag force applied.

Again commercially available strain gauges or cells having a variable resistance element located in one of the arms of a Wheatstone bridge circuit are employed. The outputs from these circuits vary with the loads applied to the cells, and the entire arrangement may be similar to that shown in FIG. 14 wherein the outputs are fed to a ratio discriminator circuit which calculates the test drag-to-weight ratio and compares it with the permissible ratio. For this purpose a control box is shown at 425 and is connected to the weight cells 404 by wire-carrying conduits 422 and 423 and to the drag cell 415 by conduit 424.

A further embodiment of the invention is shown in FIGURES. 35 to 38, and this arrangement is based upon the method of directly and independently determining the drag and weight forces imposed by a wheel. This arrangement is generally similar to the arrangement of FIGS. 31 to 34 with the exception that an equalizer bar 511 is substituted for the hydraulic system for measuring drag forces. A base plate 500 is preferably disposed beneath each of the parallel rails and spans four adjacent ties 42. The base plate is formed with downwardly projecting portions 502 that fit snugly between adjacent outer pairs of ties and is fixedly secured in place by means of suitable fasteners 503. The depending portions 502 are suitably hollowed out to form mounting chambers 504 for reception of the weight load cells 505. The weight load cells support opposite ends of intermediate plates 506 that are provided for each rail. The intermediate plates are formed with a flat upper surface for supporting a plurality of roller elements 507 for relatively frictionless rolling engagement, and these roller elements receive the movable beams 508 that are disposed in a suitably cut out portion of the track to form a portion thereof. The arrangement for determining the weight of the wheel is similar in all respects to that for the embodiment described in connection with FIGS. 31 to 34, and the present arrangement also includes similar transfer blocks 510 formed with beveled abutting faces in the usual manner. It will be noted that a slight clearance is again provided between the ends of the movable beams and the transfer blocks, and this must be of sufficient magnitude to accommodate all necessary movement.

Each of the sliding rails is preferably formed with an integral side lug 512 (see FIG. 37) that is received within a bifurcated end of the equalizer bar 511 and the parts are pivotally secured together by a suitable pin 513. The lugs 512 are each formed with an elongated slot 509 extending normal to the longitudinal direction of the rail and the connecting pin 513 is in continuous contact with the sides of the slot, while the elongated portions of the slot accommodate any play occasioned by the pivoting of the equalizer bar. The center point of the equalizer bar, in turn, is pivoted to the base plate 500, and for this purpose the equalizer bar and base plate are suitably apertured for the reception of a rod 514 threaded at the top and bottom to receive a nut 516 and washer 517 for the top and a nut 518 and washer 519 for the bottom.

The pivotal connection accommodated by the rod 514 is preferably loose fitting, as indicated in FIG. 37, and to allow for limited relative movement between the equalizer bar 511 and base plate 500, the bottom washer 519 abuts against a shouldered portion of the rod 514 and is spaced away from contact with the base plate 500.

In addition, a suitable steel rod 520 connects the equalizer bar to a drag load cell 521 of the steel column type described hereinbefore, which is anchored against a suitable buttress 522 that is rigid with the base plate.

Unequal wheel diameter effects are accommodated in the usual manner by forward movement of the beam associated with the smaller wheel and rearward movement of the beam associated with the larger wheel and the equalizer bar 511 pivots about its center point to permit such relative movement.

Drag forces urge both rails forwardly simultaneously and therefore tend to move the equalizer bar 511 forwardly and impose the combined drag load upon the drag cell 521. Such loads compress the steel column within the drag cell and for this reason a limited amount of forward movement of the equalizer bar is necessary. As previously mentioned, the equalizer bar 511 and base plate 500 are loosely connected by the threaded bar 514 to provide the necessary clearance that enables the equalizer bar to follow the compression of the drag cell 521.

In view of the explanation given in connection with previous embodiments, the detailed functioning of the arrangement of FIGS. 35 to 38 should be immediately apparent. The weight loads are imposed upon the weight cells 505, and while the load on each cell varies as the wheel progresses along the sliding rail, the total weight remains constant. Drag forces, on the other hand, are applied to the drag cell 521, and it is proposed to associate electrical resistance elements with each of these load cells in the manner set forth hereinbefore. A control box is shown at 525 which is connected to the various load-detecting elements by means of the electrical conduits 526 and 527. The control box may also include an electrical ratio discriminator of the type shown in FIG. 14 and a suitable indicating device controlled thereby.

It will be noted that the roller elements 507 in combination with the equalizer bar 511 permit substantially frictionless movement of the sliding rails in order to effectively reduce the shock effect otherwise resulting when wheels of unequal diameter pass over the sliding rails and urge them in opposite directions.

In the case of any of the foregoing embodiments, it is desirable that the movable rails be centered after each passage of a wheel pair. In FIGS. 39 and 40 there is shown an attachment that is operable to center the movable rails and that is adapted to be rendered ineffective during the time that the wheel pair is passing over the movable rails.

In FIG. 39 the opposite rail ends are designated 550 and a wheel 551 is shown passing over a movable rail 552. The centering attachment consists of a pin 553 projecting laterally from one of the rail ends 550 for engagement with a diverging slot 554 formed in the free end of a centering bar 555 that is pivotally mounted on the movable rail by means of a suitable pin 556. A suitable spring 557 reacts against a lateral projection 558 formed on the movable rail and normally urges the connecting bar upwardly so that its upper edge extends above the rail head. The parts are shown in this position in FIG. 39, and due to the reaction between the pin 553 and the slanted edge of the connecting bar, the spring 557, in effect, forces the movable rail 552 rearwardly or to the right as viewed in FIG. 39 in order to center the movable rail.

When the wheel 551 rides over the movable rail, the wheel tread depresses the connecting bar 555 to move it out of engagement with the pin 553 and thereby render the centering attachment ineffective. This automatic centering action could also be accomplished by having a spring act directly between one of the rail ends and the movable rail; however, such an arrangement would also be operative during the time when the drag forces are measured and would necessarily introduce undesired errors.

It should be appreciated that the centering attachment shown in FIGS. 39 and 40 is diagrammatic, and suitable modifications in structure would permit its use on any one of the embodiments disclosed herein. It is not believed necessary to detail such modifications in structure as would be required for each individual embodiment.

Still another alternative embodiment of the trackway-installed bearing testing apparatus of the invention is shown in FIGS. 41–51. In this form, the test rails 601 are mounted on individual inclined-plane type roller bearing pods adjacent their opposite ends to support each test rail for movement lengthwise along the trackway. The direction of travel of the cars over this apparatus is shown by the center arrow in FIG. 41, with the entering bearing pods designated generally at 602 and the leaving bearing pods designated generally at 603. In these trackway installations, a section of the tracks 32 and roadbed is removed and a concrete foundation is poured in the vacated section. As is apparent in FIGS. 41 and 42, the foundation arrangement comprises a main support pad 604 that projects above the level of the roadbed and entering and leaving concrete support pads 605 and 606, respectively, extending transversely along the opposite lengthwise ends of the main pad. A pair of cross ties 607 of the usual form is fixedly supported on each end pad.

For each test rail, a separate massive metal block or slab 608 is anchored to the main concrete pad 604 to extend along the line of the rail, with all of the stationary structural members associated with the test installation being firmly anchored to the metal slabs to establish and retain them in a permanent and accurate positional relationship. Thus the entering and leaving ends 32E and 32L, respectively, of the regular running rails are terminated and secured in accurately spaced positions on the opposite lengthwise ends of the metal slabs with suitable clamping facilities, as indicated generally at 609, securing these ends to the metal slabs. Similarly, the entering and leaving transfer blocks 610 and 611, respectively, and the bearing pods themselves are firmly bolted to the metal slabs in adjacent alignment with the ends of the running rails.

As is best seen in FIGS. 41–47, there is specific advantage in the particular track layout and rail configurations disclosed for transferring the car wheels to and from the test rails and for supporting the car wheels while riding on the test rails.

The gauge spacing of the terminal ends of the running rails 32 and the transfer blocks 610 and 611 is accurately fixed so that the car wheels are properly centered immediately as they enter upon the test rails. The massive and rigid foundation structure and associated anchoring slabs ensure that the desired spacing relationships will be maintained against loads and shocks of normal usage. It will be seen from a consideration of FIG. 45 that the flange or gauge edge 601G of each of the test rails is offset outwardly from the gauge edges 610G and 32G of the associated transfer block and running rail to provide increased gauge spacing between the test rails 601 for ensuring clearance of the wheel flanges while the car wheels are riding on the test rails. Thus the possibility of flange friction exerting a drastically increased drag upon the test rails is eliminated, and distorted measurements of the drag-to-weight characteristics of the bearings that support the car wheels are also eliminated.

In addition, the running surfaces or treads of the transfer blocks and test rails are wider than that of conventional rail by an amount sufficient to eliminate overhang of the outer edge of the wheel rim or tread, as is made more clear from a consideration of FIG. 44, which illustrates a car wheel W with its flange immediately adjacent the gauge edge of the test rail while the outer edge of the wheel rim is well within the outer edge of the test rail. It will also be apparent from a consideration of FIGS. 44, 46 and 47 that both the test rail and the transfer block are canted at an angle of 2° fifty-six minutes to match the angle of taper of new car wheels and provide a smooth ride for new car wheels while the wide tread which eliminates overhang permits old and badly worn wheels to ride on their outer rims and develop a proper rolling motion along the test rails even where the car wheel may have a highly developed flat-spot condition, such as is indicated at 612 in FIG. 44. Any time that a wheel is permitted to ride on a flat-spot region, it develops a sliding or dragging action that would seriously impair measurement of the drag-to-weight characteristics of the bearing, and this could lead to numerous false indications. It should be noted that in FIG. 44 the wheel is shown with its flange closely adjacent the gauge edge of the test rail to illustrate that even in the worst possible condition the rim of the wheel cannot overhang the field edge of its test rail. In actual practice, however, as mentioned hereinbefore, the spacing of the test rails would normally preclude the car wheels from assuming this extreme position.

It will be appreciated that a lengthwise gap is required between the transfer blocks and the movable test rails to accommodate free movement of the test rails, and special provisions are made herein to facilitate transfer of the car wheel from the stationary entering transfer block 610 to the movable test rail 601 and then to the stationary leaving transfer block 611.

As is best seen in FIG. 45, the adjacent ends of a transfer block and test rail are provided with complimentally tapered, side-by-side, lengthwise overlapping running surfaces so that at all points of its travel the car wheel is actually supported on a rail and thus is never required to jump across an open space. This arrangement affords a smooth transition and is desirable not only from the standpoint of minimizing wear and tear on the equipment but also from the standpoint of avoiding the setting up in the system of error-producing extraneous shock forces. While such forces are short-lived, in some instances they may persist into and through the actual test interval. This is another source of false indications that is eliminated by the present arrangement. The transfer blocks are bevelled upwardly along their field edge in a direction extending towards the test rail (see bevel line 610B in FIG. 45) to provide a smooth transition for car wheels that tend to ride on these outer rims.

A further feature in the rail arrangement of this embodiment resides in the fact that the adjacent ends of the transfer blocks and test rails are arranged to provide a vertical interlock for preventing the test rail from tipping up when the car wheel immediately enters or leaves it. As is explained in more detail hereinafter, each end of each test rail is mounted on a single pin bearing 613 spaced a slight distance from the end of the rail so that as a car wheel first enters upon the test rail, its weight, acting on the extreme end of the test rail, swings it upwardly about the pivot point defined by the adjacent pin bearing. To guard against this, the lower part of the pointed end of the transfer block is relieved or recessed, as indicated by the arrow at 614 in FIG. 47, to receive an abutment shoulder in the form of a laterally projecting undersurface provided on the end of the test rail, as indicated at 615 in FIG. 46. As is best seen in FIG. 45, the tip end of the transfer block 610 overhangs the abutment shoulder on the test rail 601 to block upward tipping movement of the test rail.

It should also be noted that the development of tipping of the test rail is avoided at least to some extent by virtue of the side-by-side, lengthwise overlapping arrangement of the tip ends of the transfer block and test rail. As the car wheel is riding over the region of overlap, its tendency to depress the tip end of the test rail is limited so long as it is able to ride with its outer rim on the tip of the transfer block. Thus, at the point of transition from a transfer block to a test rail or vice versa, vertical tipping of the test rail is resisted in two respects: the transfer block at the unengaged end of the test rail opposes upward movement by virtue of the vertical interlock while the transfer block at the engaged end of the test rail opposes downward movement at this end by partially supporting the car wheel as it rides over the extreme end of the test rail.

Preparatory to describing the theory of operation and the functioning of this preferred embodiment, the construction of the bearing pods and the arrangement for supporting the test rail on these pods is described in detail. All of the bearing pods are of identical construction, and a description of one will suffice for all.

As is apparent from a consideration of the longitudinal sectional and transverse sectional views of FIGS. 48 and 49, respectively, each pod includes a generally circular base plate 620 suitably bolted to the metal slab 608 and having a central positioning slot 620S elongated in the direction of the length of the test rail and opposed pairs of radial bores extending transversely and lengthwise of the test rail for receiving transverse positioning pins 621T and lengthwise positioning pins 621L. These pins are in the form of dowel rods and are formed with an annular groove for an O-ring seal intermediately therealong. The transverse pins are adjustable under the control of threaded rods 622T and the lengthwise pins are similarly adjustable under the control of threaded rods 622L. The base plate is formed with an annular pocket which fixedly receives and positions a concave spherical seat ring 623 which in turn engages a convex spherical seat ring 624 that is adjustably disposed therein for determining the effective angle of incline of the bearing pod. The upper convex seat ring is interlocked with a central disc 625 that has a generally rectangularly shaped depending post 625P that projects into the positioning slot of the base ring for selectively setting the incline of the upper convex seat ring under the control of the threaded rods 621. The upper surface of the convex seat ring is smooth and flat and forms a suitable rollway for a plurality of rollers 626 which in turn support an upper rollway plate 627 having the shape of a ring. The upper rollway plate is in turn interlocked with a central disc 628 that includes a generally circular upstanding post 628P that is mechanically interlocked within a circular pocket provided centrally in the bottom of a main support pad 629 in the shape of a generally circular disc. This main support pad thus rests upon and is fixedly interlocked with the upper rollway plate for conjoint movement with this plate in the direction of the length of the rail. The rollers 626 accommodate such movement with a minimum of friction.

To align the rollers for the proper direction of movement of the main pad, a ring-shaped brass retainer plate 630 is disposed between the rollway surfaces. This plate, as best seen in FIG. 50, is provided with a large number of slots 630S in which the rollers are received and maintained in proper alignment and at its forward and rearward ends the retainer plate is formed with open-ended guide slots 630G that cooperate with suitable bushings 631B carried from bolts 631 that are fixed in the main support pad 629 adjacent its opposite lengthwise ends. Thus, the main support pad, by means of the bolts 631 and bushings 631B, maintains proper alignment of the retainer plate 630 and thereby maintains proper alignment of the rollers 626 to facilitate frictional shifting of the support pad in the direction of the length of the rail. The entire pod assembly is retained against transverse misalignment by a tubular centralizing plug 632 which, as best shown in FIG. 49, is engageable between the interlocking discs 625 and 628 for directly maintaining transverse alignment of the rollway plates 624 and 627. This centralizing plug, as is apparent in FIG. 48, accommodates such relative lengthwise movement of the rollway plates as is required.

In order to minimize internal friction, the bearing pods are lubricated and accordingly, the pod assembly is provided with a generally cylindrical lubricant retaining boot 633 that telescopes over the main support pad 629 and concave lower spherical seat 623 to provide a substantially enclosed housing for the internal parts of the bearing. A suitably notched steel spacer ring 634 telescopes over the boot adjacent its bottom end and receives an O-ring gasket 635 for sealing the bottom section of the assembly against leakage of lubricant. Finally, a ring-like cap or cover shield 636 is applied over the main support pad and is supported upon a marginal lip 629L of the pad to overhang the top section of the boot and provide a mechanical shield that adequately protects the boot against mechanical rupture or breakage.

As is best seen in FIG. 49, the main support pad is of substantial depth and is formed with a lengthwise extending guideway 629G for the reception of the adjoining ends of the test rail and transfer block. The transfer block, of course, is independent of the bearing pod while the test rail is supportedly connected to the main pad of the bearing pod through the pin bearing 613. The pin bearing itself is disposed in an accurately machined transverse bore 629B provided in the main pad, with the upper part of the bore intersecting the lower part of the guideway. The axis of the pin defines the pivot point of the rail suspension system.

It will be seen, therefore, that the bearing pod is a ruggedly constructed, substantially frictionless inclined plane having a point suspension for the test rail. The pod assembly is suitably interlocked against undesired transverse shifting of the relatively movable parts and provides effective longitudinal guiding action for accommodating lengthwise shifting of the test rail. The effective angle of the bearing pod is controlled by the lengthwise extending threaded rods 622L which position the dowel pins 621L that abut the end faces of the depending positioning post 625P, any changes in the adjustment of the position of this post being transmitted to the upper spherical seat ring 624 which is smoothly slidably adjustable for varying the effective angle of incline of the rollway surfaces between which the rollers 626 are engaged. After the lengthwise angle is appropriately selected, the transverse rods 622T and dowel pins 621T are tightly set against the sides of the positioning post 625P to fix the bearing pod assembly in accurate transverse alignment.

Thus, the test rails 601 are supported at each end on point suspensions provided by the pin bearings 613 of each bearing pod assembly, with free lengthwise movement of each test rail being accommodated by the substantially frictionless roller bearing arrangement so that it is free to respond to the drag-to-weight ratio of the forces imposed on it by the car wheels as they ride over the test layout.

It will be understood that in the preferred form the bearing pods are adjusted to cause the test rails to respond only when the effective drag-to-weight ratio to which it is subjected by the wheel pair exceeds some predetermined value that is selected in accordance with the needs of the situation. The arrangement of the effective angle of the pods for this purpose is discussed hereinafter.

In order to produce a convenient indication of the fact of forward movement of the test rail, each rail is arranged to operate a separate circuit-closing switch 638, the position of which is dependent upon the lengthwise position of the test rail. Since the switch construction forms no part of this invention, it is shown only diagrammatically in FIG. 42, which illustrates an arrangement for controlling the switch in accordance with the lengthwise position of the test rail. The mechanical arrangement for mounting and actuating each switch 638 is identical in the case of each rail and, as shown, each switch is housed in a suitable mounting block 639 that is securely anchored to the metal slab 608 to underlie the test rail 601 at a point approximately centrally along its length. The switch preferably includes an actuating arm projecting longitudinally from the mounting block into operative engagement with an abutment bracket 640 that depends from the under-side of the test rail is in its centered neutral position or is displaced rearwardly therefrom, the bracket engages and holds the switch arm retracted to hold the switch contacts open. When the test rail moves a predetermined distance forwardly of its neutral position and carries the bracket 640 away from the switch arm, the switch contacts are closed to prepare a control circuit (see FIG. 51) for an indicating device 641 that signals the presence of a bad bearing condition.

As is explained in connection with the description of some of the earlier embodiments, there is advantage in arranging the indicating circuit so that a bad bearing condition will be indicated only when both test rails have moved forwardly of their neutral position by a predetermined amount. Such an arrangement is not subject to false indications such as can be caused by wheel pairs of unequal diameter. It will be recalled that where the wheels are of unequal diameter, the wheels, independently of the bearing characteristics, normally tend to advance the test rail that is associated with the wheel of smaller diameter.

Accordingly, in the control circuit for the indicator that is used with this embodiment, the rail switches 638 are connected in series so that the circuit will be completed only when both test rails have moved forwardly of their neutral position. It will be understood that the indicator 641 shown in this circuit may take the form of an alarm bell, a warning light, a paint dispenser for directly marking a bad bearing, a recording printer, a signalling circuit to a remote monitoring point, or any other device capable of indicating or otherwise marking or recording the dangerous bearing condition.

As shown in FIG. 51, the control circuit includes a third normally open switch 642 that is arranged to operate for a brief instant when the car wheels arrive at a certain point along the test rails. This switch may be controlled by a car-wheel operated track switch, as is explained in the case of earlier embodiments or, as best seen in FIGS. 41, 42 and 44, this switch may be under the control of an electric eye that responds when it sees the car wheel. A preferred electric eye arrangement employs a rigid piping assembly that includes a pair of vertical posts 644 arranged on opposite sides of one of the test rails and a horizontal section 645 that is clamped in a pair of pillow blocks 646 and extends transversely beneath the test rail. The pillow blocks are anchored to the base slab at any one of a number of possible longitudinal locations afforded by a set of mounting holes 646H (see FIG. 41) provided in the base slab to provide a rough adjustment of the point at which the electric eye operates. Further fine adjustments of this point are provided by the rigid frame assembly which is angularly adjustable in the pillow blocks 646.

It should be noted that with the disclosed arrangement the electric eye sets up the control circuit for operation only after the car wheel is well onto the test rails and, preferably, more than halfway along. This gives the unit time to dissipate the shock effects developed when the wheels move onto the test rail, and it also permits the wheel and truck assembly to unwind and release any energy that is stored up by virtue of a twisted axle condition. In addition, the wheel pair is permitted to center itself in free rolling condition on the rails, and the test rail has ample time to overcome its mass inertia and complete its movement to the position dictated by the drag-to-weight characteristic of the car wheels. To facilitate the release of stored energy and the dissipation of the associated shock forces, the test rail is mounted for free movement at all times.

It will be noted that the angle of incline of the test rail is such that as the car wheels ride onto it, the weight force imposed on the test rail acts to heel it towards the entering transfer pod so that each test rail will hold its associated track switch open. In the preferred form, each test rail is formed with a socket 601S (see FIG. 42) opening through its underneath face for receiving a stop pin 647 that is anchored to the mounting block 639 for the rail-operated switch. The socket and stop pin are both circular, with the diameter of the socket being approximately ⅝" greater than that of the pin to allow ⅝" overall movement of the rail.

In the preferred arrangement, the angle of incline of the entering and leaving bearing pods are given a differential setting rather than equal settings; for example, the effective angle of incline of the entering pod may be set to correspond to a 30 lb. per ton drag-to-weight ratio while the angle of the leaving pod may be set to correspond to a zero lb. per ton drag-to-weight ratio. Thus, when the car wheels are riding directly over the entering pod, the stabilizing or counter-drag force developed is equal to 30 lb. per ton while when the car is directly over the leaving pod, the stabilizing force is zero lb. per ton. It will be apparent that the effective stabilizing ratio at intermediate points along the length of the test rail will be determined by the settings on the entering and leaving pods. For example, at the halfway point, the stabilizing ratio will correspond to fifteen lb. per ton. With this arrangement, the heeling effect of the test rail is a maximum at the time that the car wheel moves onto the rail, and this ensures that there will be an adequate opportunity for overcoming the mass inertia of the test rail in time to physically return the rail to its rearward position and allow subsequent forward movement of it as determined by the bearing condition. Thus, the steep initial angle presented by the test rail provides a reliable built-in initial positioning for the rail. The steep angle also permits the rail and its supporting system to develop a built-in shock absorbing action since the weight of the car acting at this relatively steep angle holds the test rail against "chattering." The differential setting of the bearing pods affords convenient adjustment in the setting of the drag-to-weight ratio, this setting being varied merely by changing the physical location of the electric eye circuit. Since accuracy in the lengthwise mounting position of the electric eye may be achieved with ease and reliability, obvious operating advantages exist with the differential setting arrangement. To achieve comparable accuracy in adjustment by varying the effective angle of the bearing pods is quite difficult.

It should be apparent that the precise angular settings for the entering and leaving pods may be selected at various values; and while in the foregoing example the leaving pod was set at a zero angle, this is obviously not necessary. It may be given any angular setting that appears desirable.

A final embodiment of the track-way installed bearing testing apparatus of the invention and one which is presently considered the preferred commercial form is shown in FIGS. 52–57. In this form, each test rail 701 is mounted for independent movement lengthwise along the trackway. The direction of travel of cars traversing this apparatus is indicated by the center arrow in FIG. 52. In this trackway installation, a section of each track 32 and its roadbed is removed and a separate concrete footing 702 is poured along the line of each of the removed sections of track rail. As is apparent in FIGS. 52 and 53, a number of I-beams 703 are anchored to the concrete footings 702 and are positioned to extend transversely of the trackway to provide a firm base structure for the apparatus.

For each test rail a separate elongated metal plate or slab 704 is anchored to the I-beams and extends underneath and along the line of the rail, with all of the stationary structural members associated with the test apparatus being firmly anchored to the metal slabs to establish and retain an accurate positional relationship therebetween. Thus, the entering and leaving ends 32E and 32L, respectively, of the conventional running rails are terminated and secured in accurately spaced positions on opposite ends of the slabs with suitable clamping facilities, as indicated generally at 705, anchoring the rail ends to the slabs. Similarly the entering and leaving transfer blocks or castings 706 and 707, respectively, are firmly bolted to the metal slabs 704 in accurate alignment with the ends of the running rails.

In the present arrangement, the transfer rails 706R and 707R are preferably separate from the transfer castings and are mounted in accurate alignment therein through locating key-and-slot arrangements that are interlocked by suitable fasteners indicated generally at 708 in FIGS. 55 and 57. Similarly, the test rail 701 is mounted in a separate test-rail cradle or casting 709 and is located in accurate alignment therein by a suitable locating key-and-slot arrangement that is interlocked by suitable fasteners indicated generally at 710 in FIGS. 54 and 57. The test-rail cradle is arranged for movement as a unit with its test rail, and each cradle is supported at each of its four corners on separate bearing pod assemblies that are housed in the transfer castings and disposed in rectangular spatial relation. In the case of each test rail, two pods are provided adjacent the entering end of the test rail and are designated generally as 711G and 711F, respectively, to represent that one is located on the gauge side of the test rail and the other is located on the field side of the test rail. Similarly, two bearing pods are provided adjacent the leaving end of the test rail and are designated 712G and 712F.

It should be understood that the test rail 701 and transfer rails 706R and 707R have the same general layout and configurations as respects the wide rail, laterally offset test rail construction and the interlocking, overlapping rail end constructions as do the test rail 601 and transfer rails or blocks 610 and 611 of the embodiment shown in FIGS. 41–51.

Thus, there is provision for resisting tipping of the test rail; however, in the embodiment of FIG. 52 it will be noted that the bearing pods are located beyond the maximum extension of the test rail itself and therefore as the car wheel transfers from the entering transfer rail 706R to the test rail 701, it is at a position to load the test rail casting at a point that is intermediate the entering and leaving bearing pods and there is no tendency for the test rail to tip. The same is true at the leaving end of the test rail. Thus, with the disclosed arrangement, the test rail is stable against tipping in its vertical plane. At both the entering and leaving ends, the bearing pods are arranged on opposite sides of the test rail to make the test rail stable against tipping or turning about the longitudinal axis of the rail.

In this preferred arrangement, the angle of entry of the entering and leaving bearing pods is predetermined and is not subject to adjustment. As suggested in FIG. 53, the effective angle of entry of the entering pods 711 is selected to be 0°52′, while the angle of the leaving pods 712 is selected at 0°. Thus, when the car wheels enter upon the test rail, the stabilizing force is a maximum and as the car wheels are about to leave the test rail the stabilizing force is a minimum. This arrangement has the advantage that each test rail is automatically heeled by the action of the car wheel as it rides onto the test rail. The relatively steep angle at the entering pods allows the rail and its supporting system to develop a built-in shock-absorbing action.

In the present embodiment, it is contemplated that convenient adjustment in the setting of the drag-to-weight ratio to which the test rail is to respond may be had by altering the physical location of an electric eye circuit, which, as indicated at 714 in FIG. 52, may correspond generally with that shown in FIG. 44. In FIG. 52, electric switches are shown at 713 for responding upon forward lengthwise shifting movement of the test rails 701 and their mounting cradles 709. The switches 713 and electric eye circuit 714 may be connected in a control circuit of the type shown in FIG. 51.

It should be apparent that the precise angular settings for the entering and leaving pods may be selected at various values, though, of course, it is quite desirable that all entering pods be set at a desired common angle and that all leaving pods be set at a desired common angle.

The bearing pods are mounted within chambers defined by upstanding cylindrical wall structure 715 that is formed integrally with the transfer castings 706 and 707 at points on each casting spaced on opposite sides of the test rail and in alignment with the transverse keyways 704K (see FIGS. 55, 56 and 57) that are formed in the base plates 704. The cylindrical wall structure 715, as best shown in FIGS. 55 and 56, is of stepped internal configuration to define pod chambers of smaller diameter at the bottom than at the top.

As best shown in FIG. 56, each bearing pod includes a lower race 716 of cylindrical form that nests snugly within the bottom of its pod chamber, an upper race 717 having an integral cover plate 717P overlying the top of the pod chamber and having a depending race-defining stub 717S of cylindrical form, and a single ball bearing 718 operable between the upper and lower races to provide substantially frictionless relative movement therebetween in the lengthwise direction of the rail.

The lower races 716 for the bearing pods 712F and 712G at the leaving end of the test rail are identical in construction and each has an endless groove provided with an O-ring sealing gasket 719 intermediately of its height.

As indicated, the lower race has a depending key 716K for locating engagement in the keyway 704K, and this keying arrangement orients the lower race with its open-topped, V-shaped raceway in exact parallel underlying relation with the line of the test rail. The lateral position of the lower race is, of course, fixed by the location of the cylindrical wall structure 715 of the transfer casting. As is indicated in FIG. 53, the lower races for the leaving pods 712 have their raceways arranged exactly horizontally, whereas the lower races for the entering pods 711 have their raceways inclined upwardly in the direction of car movement at an angle of 0°52′.

Each of the upper races 717 is formed with an upstanding rib 717R along its lengthwise center line for reception and interlocking engagement in a lengthwise keyway 709K (see FIG. 56) provided in the corresponding corner structure 709C of the test-rail cradle. The cradle corner structure and upper race are provided with registering openings arranged along the vertical center line of the races, and a suitable locking pin 720 is mounted on these openings to secure the test-rail cradle in fixed relation to the upper races. Once again the upper races 717 for the pods 712 at the leaving end of the test rail have horizontal raceways for exact parallelism with the lower races, while the upper races for the pods 711 at the entering ends of the test rail have their raceways inclined upwardly in the direction of car movement at an angle of 0°52′.

In order to facilitate manufacture and to eliminate the possibility of developing a lateral wedging action, the pods for supporting each test rail end are constructed so that the upper race of the field side pod 711F or 712F has a raceway of inverted V-configuration and so that the upper race for the gauge side pod 711G or 712G has a flat raceway. This arrangement minimizes dependence upon manufacturing tolerances. The upper races, which are in fixed engagement with the test-rail cradle 709, will ride on the support balls 718 so that the raceway of the upper race for the field side pod 712F is precisely centered over the ball and the corresponding V-shaped raceway of the lower race, with substantially the entire area of the flat raceway of the upper race of the gauge side pod being capable of engagement with the top of its supporting ball.

Characteristically low internal friction is one of the important advantages of the embodiment of FIGS. 52–57. Relative movement between the test rail and its supporting structure is resisted only by rolling friction of the large ball bearings 718 in their cooperating raceways. This internal friction in the bearing pods is further minimized by providing a lubricating bath for each pod. Accordingly each pod is provided with a cylindrical liner 721 arranged in the cylindrical wall structure 715 of the transfer casting and having its upper end securely attached to the bottom end of a generally cylindrically shaped, bellows-like rubber boot 722, the upper end of which is in sealing engagement around the depending circular stub 717S of the upper race, with the boot being freely extensible to accommodate the shifting movement of the test rail with a minimum of opposition.

A fill passage 723 for the lubricant bath extends through the overlying corner structure 709C of the test-rail cradle, through the locking pin 720, and through the center of the upper race 717. The chamber for the lubricant bath is sealed by the O-ring gasket 719 of the lower race, the O-ring gasket 724 of the cylindrical liner, the connection of the boot 722 to the liner 721 and the connection of the boot to the upper race, the O-rings 725 of the locking pin 720, and a filler plug 726 provided in the test-rail cradle.

In the structure shown in the embodiment of FIGS. 52–57, it is necessary to provide a positive stop to prevent the tapered ends of the test rail and transfer rails from coming into engagement and setting up lateral forces since such lateral forces would be destructive of the bearings. Accordingly, the depending end webs 709W of the test-rail cradle 709 are provided with circular bosses 709B that provide planar abutment surfaces extending transversely of the test rails. Correspondingly, the transfer casting 707 is provided with a bore facing the abutment boss and arranged to receive a bumper assembly, designated generally as 727, that includes a rod 728 (preferably formed of a phenolic condensation product) fixed in place by a bolt 729 that is telescoped through the rod and is disposed in countersunk relation within the outer end of the rod. The bolt is threaded directly into the transfer casing 707 to retain the bumper (preferably formed of a phenolic condensation product) fixed in place in alignment with the abutment boss 709B. Identical stop arrangements are provided at both ends of the unit and the arrangement of the abutment surfaces in planes normal to the line of the rail avoids the establishment of destructive lateral forces.

Thus the objects of the present invention have been accomplished in that each of the disclosed embodiments is a track-installed device that responds to the ratio of the linear drag force to the weight force that is imposed upon a rail section by each wheel pair of a railway car. The drag-to-weight ratios associated with a railway car having incipient bad bearing conditions in the journal boxes are sufficiently different from the drag-to-weight ratios of cars having properly functioning journal boxes as to permit detection of such conditions before they actually become dangerous. The concept of detecting drag-to-weight ratios may be embodied in a variety of different types of track-installed devices and a number of such embodiments have been disclosed.

It should be understood that the description of these preferred embodiments of the invention is for the purpose of complying with Section 112, Title 35, of the U.S. Code and that the appended claims should be construed as broadly as the prior art will permit.

I claim:

1. In apparatus for testing railway car bearings that support a railway car from an axle carried by a pair of car wheels integral therewith; a movable test rail interposed in each rail of a track section for traversal simultaneously by said wheel pair, stabilizing means located in supporting relation to each of said test rails and responsive proportionally to the weight imposed on each test rail by the associated car wheel to apply a counter force to each of the said test rails in opposition to the drag force imposed on each test rail by each associated car wheel, independent detecting means for each test rail and responsive to forward movement thereof under the forces applied thereto during the passage of the wheel pair, and indicating means responsive only when both detecting means respond.

2. In apparatus for testing railway car bearings that support a railway car from an axle carried by car wheel means; test rail means interposed in a track section, detecting means comprising means for detecting the weight force imposed on the test rail means by the car wheel means and means for detecting the drag force imposed on the test rail means by the car wheel means, discriminator means connected to said detecting means to respond to drag-to-weight ratios that exceed a predetermined value, and indicating means actuated by said discriminator means.

3. In apparatus for testing railway car bearings that support a railway car from an axle carried by a pair of car wheels integral therewith; a test rail interposed in each rail of a track section adapted to be traversed substantially simultaneously by said wheel pair, detecting means which comprises means for each rail for detecting the total weight force imposed on the test rails by the wheel pair and which comprises also means for each rail for detecting the total drag force imposed on the test rails by the wheel pair, discriminator means connected to said detecting means to respond to composite drag-to-weight force ratios for each wheel pair that exceed a predetermined value, and indicating means actuated by said discriminator means.

4. In apparatus for testing railway car bearings that support a railway car from an axle carried by a pair of car wheels integral therewith; a test rail interposed in each rail of a track section and traversed simultaneously by said wheel pair, separate weight cell means supporting each of said test rails to detect the weight imposed on each rail by each wheel, separate drag cell means detecting the drag imposed on each rail by each wheel, discriminator means connected to said cell means to respond to composite drag-to-weight ratios for each wheel pair that exceeds a predetermined value, and indicating means actuated by said discriminator means.

5. In apparatus for testing railway car bearings that support a railway car from an axle carried by a pair of car wheels integral therewith; a test rail interposed in each rail of a track section and traversed simultaneously by said wheel pair, each of said test rails being supported at opposite ends and having a detecting element secured at an intermediate point and responsive to bending of said rail as a measure of the weight imposed on each rail by its associated wheel, separate drag cell elements to detect the drag imposed on each rail by each wheel, discriminator means connected to said elements to respond to composite drag-to-weight ratios for each wheel pair that exceed a predetermined value, and indicating means actuated by said discriminator means.

6. In apparatus for testing railway car bearings that support a railway car from an axle carried by a pair of car wheels integral therewith, a movable test rail interposed in each rail of a track section and traversed simultaneously by said wheel pair, support means for each test rail, each of said test rails and said support means having similarly inclined front and rear cooperating facing surfaces spaced apart by frictionless roller means, said surfaces rising from rear to front in the direction of movement of said railway car such that the weight of the car wheel acting on the inclined surfaces of the support means develops a proportional counter force that acts on each test rail in opposition to the drag force imposed by the associated car wheel, said support means having a rear stop that normally abuts each test rail to prevent rearward movement thereof and a front stop spaced from said test rail to accommodate forward movements due to drag forces and forward movements occasioned by wheel pairs of unequal diameter, independent detecting means for each test rail and responsive to movements of the associated test rail occasioned by drag forces that exceed the associated counter forces, and indicating means actuated only when both of said detecting means are actuated by said test rails in responding to excessive drag forces.

7. In apparatus for testing railway car bearings that support a railway car from an axle carried by a pair of car wheels integral therewith; a test rail interposed in each rail of a track section for limited forward and rearward longitudinal movement and traversed simultaneously by said wheel pair, support means supporting said rails for relatively frictionless longitudinal movement, said support means being mounted on weight cell means for detecting the weight imposed on said test rails by said wheel pair, an equalizer bar pivotally connected to each of said test rails and pivoted centrally against movement relative to said support means, said equalizer bar allowing relative longitudinal movement of said test rails in opposite directions to accommodate wheel pairs of unequal diameter, drag cell means connected to the center of said equalizer bar for detecting the drag imposed on said test rails by said wheel pair, discriminator means connected to said cell means to respond to composite drag-to-weight ratios for each wheel pair that exceed a predetermined value, and indicating means actuated by said discriminator means.

8. In apparatus for testing railway car bearings that support a railway car from an axle carried by a pair of car wheels integral therewith; a separate test rail interposed in each rail of a track section for limited forward and rearward longitudinal movement and traversed simultaneously by said wheel pair, means for responding to weight forces and to drag forces applied to said test rails during the passage of the car wheels over the test rails, detecting means to respond to the last named means in accordance with the drag-to-weight force ratios imposed on said test rails by said wheel pair that exceed a predetermined value, equalizing means connected between said test rails to allow relative longitudinal movement of said test rails in opposite directions to accommodate wheel pairs of unequal diameter, and indicating means actuated by said detecting means.

9. In apparatus for testing railway car bearings that support a railway car from an axle carried by a pair of car wheels integral therewith; a movable test rail interposed in each rail of a track section and traversed simultaneously by said wheel pair, support means for each test rail, each of said test rails and said support means having cooperating facing surfaces, said surfaces inclining upwardly in the direction of movement of said railway car over said test rails such that the weight of the car wheels acting on the inclined surfaces of the support means develops proportional counter forces that act on the test rails in opposition to the drag forces imposed by the car wheels, anti-friction means between said cooperating surfaces to facilitate movement of the test rail, said support means having rear stop means normally abutting said test rails to prevent rearward movement thereof and front stop means spaced from said test rails to accommodate forward movements due to drag forces and forward movements occasioned by wheel pairs of unequal diameter, independent detecting means for each test rail and responsive to movements of the associated test rail occasioned by drag forces that exceed the associated counter forces, and indicating means actuated only when both of said detecting means are actuated by said test rails in responding to excessive drag forces.

10. In apparatus for testing railway car bearings that support a railway car from an axle carried by car wheel means; test rail means operatively interposed in a track section for receiving drag and weight forces from car wheel means during passage thereover, stabilizing means proportionally responsive to the action of the test rail means under the weight force imposed thereon by the car wheel means to apply a predetermined counter force in opposition to the drag force, detecting means responsive to the action of the test rail means under the forces applied thereto during the passage thereover of the car wheel means to respond when the drag-to-weight ratios imposed on the test rail means exceed the ratio of the counter force to the weight force, and indicating means actuated by said detecting means.

11. In apparatus for testing railway car bearings that support a railway car from an axle carried by car wheel means; test rail means operatively interposed in a track section for limited movement in the direction of its length and receiving drag and weight forces from car wheel means passing thereover, stabilizing means proportionally responsive to the action of the test rail means under the weight force imposed thereon by the car wheel means to apply a predetermined counter force in opposition to the drag force, detecting means responsive to the action of the test rail means under the forces applied thereto during the passage thereover of the car wheel means to respond when the drag-to-weight ratios imposed on the test rail means exceed the ratio of the counter force to the weight force, and indicating means actuated by said detecting means.

12. In apparatus for testing railway car bearings that support a railway car from an axle carried by car wheel means; test rail means operatively interposed in a track section for receiving drag and weight forces from car wheel means passing thereover, stabilizing means supporting the test rail means for limited movement in the general direction of its length and proportionally responsive to the weight force imposed on the test rail means by the car wheel means to apply a predetermined counter force in opposition to the drag force, switch means actuatable in response to forward movement of the test rail means, and indicating means actuated by said switch means.

13. Test track apparatus interposed between and in general lengthwise alignment with the entering and leaving ends of conventional track rails for testing the rolling characteristics of a unitary wheel pair of a railway car, said apparatus comprising movable test rails for cooperably supporting the wheel pair in free rolling relation thereon, entering and leaving anti-friction bearing pods individually supporting each test rail adjacent its ends, each pod including a support member freely movable along a predetermined effective angle of incline in the lengthwise direction of the associated test rail and a pin bearing mounted in the support member and pivotally supporting the test rail, with the effective angles of incline of said pods being such that the weight of the wheel pair acting on each test rail develops a counterforce that acts in opposition to the drag force imposed by such wheel pair, stop means for limiting lengthwise movement of the test rails, detecting means responsive to lengthwise movements of the test rails occasioned by the wheel pair during passage thereover, and indicating means actuated by said detecting means.

14. The arrangement of claim 13 wherein each of said pods has a lower rollway plate having a flat upper surface inclined at said predetermined angle, an upper rollway plate having a flat lower surface, a plurality of rollers interposed between said plates in operative engagement with said surfaces and accommodating substantially frictionless relative movement therebetween in the direction of said angle of incline.

15. The arrangement of claim 13 wherein each of said pods has base structure generally ring-like in form and providing an upwardly open slot extending lengthwise of the associated rail, radially lengthwise extending open-ended bores communicating with the slot at opposite ends thereof, and a concave spherical seat surface encircling the slot, intermediate structure having a convex spherical surface seated in said concave surface, a depending post extending into said slot and an upwardly facing bearing surface, rods adjustably mounted in said bores to engage said post for selectively setting the angle of incline of said bearing surface, movable support structure including said support member and having a downwardly facing bearing surface, and anti-friction means between said bearing surfaces.

16. The arrangement of claim 13 wherein a control switch normally maintains said indicating means inoperative, said control switch having actuating means located intermediately along the length of one of the test rails and responsive to the arrival thereat of the wheel pair for enabling the indicating means.

17. The arrangement of claim 13 wherein the effective angle of incline of the entering pods is substantially steeper than the effective angle of incline of the leaving pods and wherein a control switch normally maintains the indicating means inoperative, said control switch having actuating means responsive to the arrival thereat of the wheel pair for enabling the indicating means, and means for selectively mounting the actuating means intermediately along the length of one of the test rails.

18. Test track apparatus interposed between and in general lengthwise alignment with the entering and leaving ends of conventional track rails for testing the rolling characteristics of a unitary wheel pair of a railway car, said apparatus comprising movable test rails for cooperably supporting the wheel pair in free rolling relation thereon, entering and leaving anti-friction bearing pods individually supporting each test rail adjacent its ends, each pod including a support member freely movable along a predetermined effective angle of incline in the lengthwise direction of the associated test rail and a pin bearing mounted in the support member and pivotally supporting the test rail, with the effective angles of incline of said pods being such that the weight of the wheel pair acting on each test rail develops a counterforce that acts in opposition to the drag force imposed by such wheel pair, stop means for limiting lengthwise movement of the test rails, independent detecting means for each test rail and responsive to movements of the associated test rail occasioned by drag forces in excess of the corresponding counterforces, and indicating means responsive only when both of said detecting means are actuated by said test rails.

19. An apparatus for testing railway car bearings that support a railway car from an axle carried by a pair of car wheels, a movable test rail interposed in each rail of a track section, said test rails being disposed so as to be traversed simultaneously by said pair of wheels, independent stabilizing means supporting each end of each test rail and responsive proportionately to the weight imposed thereon by the car wheel traversing the associated test rail to apply a counterforce to such associated test rail in opposition to the drag force imposed thereon by the associated car wheel, detecting means for each test rail and responsive to forward movement of the test rail under forces applied thereto during the passage of the wheel, and indicating means responsive only when both detecting means respond.

20. An apparatus for testing railway car bearings that support a railway car from an axle carried by a pair of car wheels, a movable test rail interposed in each rail of a track section, said test rails being disposed so as to be traversed simultaneously by said pair of wheels, independent stabilizing means supporting each test rail at its entering and leaving ends, said stabilizing means including a lower member having a straight upper surface extending generally in the lengthwise direction of the associated test rail and an upper member connected to said associated test rail and freely movable along said upper surface, the angle of incline of the upper surface of the stabilizing means at the entering end of the test rail being such that the weight of the wheel acting on the test rail develops a counterforce that acts in opposition to the drag force imposed by said wheel, detecting means for each test rail and responsive to lengthwise movement of the test rail occasioned by the wheel during passage thereover, and indicating means actuated by said detecting means.

21. An apparatus for testing railway car bearings that support a railway car from an axle carried by a pair of car wheels, a movable test rail interposed in each rail of a track section, said test rails being disposed so as to be traversed simultaneously by said pair of wheels, independent stabilizing means supporting the entering and leaving end of each test rail, said stabilizing means including a lower member having a straight upper surface extending generally in the lengthwise direction of the associated test rail, and an upper member connected to said associated test rail and freely movable lengthwise along said upper surface, the angle of the incline of the upper surface of the stabilizing means at the entering end of the test rail being such that the weight of the wheel acting on the test rail develops a counterforce that acts in opposition to the drag force imposed by the wheel, independent detecting means for each test rail and responsive to forward movement thereof under the forces applied thereto during the passage of the wheel, the angle of incline of the upper surface of the stabilizing means at the entering end of the test rail being steeper than the angle of incline of the upper surface of the stabilizing means at the leaving end of the test rail whereby the drag force necessary to move the test rail is lessened as the wheel moves therealong, indicating means actuated by said detecting means, a control switch associated with one of said test rails normally maintaining the indicating means inoperative, said control switch having actuating means responsive to the arrival of the wheel at a selected point along said last-named test rail for enabling the indicating means.

22. Test track apparatus interposed between and in general lengthwise alignment with the entering and leaving ends of conventional track rails for testing the rolling characteristics of a railway car that is supported on an axle carried by a pair of car wheels and comprising a pair of movable test rails for cooperably supporting a pair of wheels in free rolling relation thereon, independent stabilizing means supporting each test rail at its entering and leaving ends, said stabilizing means each including lower structure having an upper surface at each side of the adjacent end of the associated test rail, with said upper surfaces extending in straight, parallel directions corresponding generally to the lengthwise direction of said associated test rail, and upper structure rigid with said associated test rail and freely movable in supported relation along said parallel extending upper surfaces, the effective angle of incline of the upper surfaces of the stabilizing means at the entering end of each test rail being such that the weight of the wheel acting on each test rail develops a counterforce that acts in opposition to the drag force imposed by such wheel, detecting means for each test rail and responsive to forward lengthwise movement thereof occasioned by the wheel passing thereover, and indicating means actuated by said detecting means.

23. Test track apparatus interposed between and in general lengthwise alignment with the entering and leaving ends of conventional track rails for testing the rolling characteristics of a railway car that is supported on an axle carried by a pair of car wheels and comprising a pair of movable test rails for cooperably supporting a pair of wheels in free rolling relation thereon, independent means supporting each test rail at its entering and leaving ends, said supporting means each including lower structure having an upper surface at each side of the adjacent end of the associated test rail, with said upper surfaces extending in parallel directions corresponding generally to the lengthwise direction of said associated test rail, upper structure rigid with said associated test rail and having lower surfaces corresponding to and overlying said upper surfaces, and antifriction means between said upper and lower surfaces supporting said upper structure for free movement along said upper surfaces, the upper surfaces of the supporting means at the entering end of each test rail having an angle of incline in the lengthwise direction of said rail such that the weight of the wheel acting on each test rail develops a counterforce that acts in opposition to the drag force imposed by such wheel, separate detecting means for each test rail and each responsive to forward lengthwise movement thereof occasioned by the wheel passing thereover, and indicating means actuated only upon concurrent response of both said detecting means.

24. The arrangement of claim 23 wherein each set of cooperating upper and lower surfaces is located at a point beyond the corresponding end of its test rail such that each test rail applies weight forces to all of the said upper surfaces associated therewith during the entire travel of said wheel thereover.

25. The arrangement of claim 23 wherein each of said supporting means has lower surfaces of V-shaped transverse cross-sectional configuration, with one upper surface being of inverted V-shaped transverse cross-sectional configuration and with a second upper surface being of flat cross-sectional configuration and wherein each of said antifriction means is a single ball bearing.

26. Test track apparatus interposed between and in general lengthwise alignment with the entering and leaving ends of conventional track rails for testing the rolling characteristics of a railway car that is supported on an axle carried by a pair of car wheels and comprising a pair of movable test rails for cooperably supporting a pair of wheels in free rolling relation thereon, independent means supporting each test rail at its entering and leaving ends, said supporting means each including lower structure having an upper surface at each side of the adjacent end of the associated test rail, with said upper surfaces extending in parallel directions corresponding generally to the lengthwise direction of said associated test rail, upper structure rigid with said associated test rail and having lower surfaces corresponding to and overlying said upper surfaces, and antifriction means between said upper and lower surfaces supporting said upper structure for free movement along said upper surfaces, the upper surfaces of the supporting means at the entering end of each test rail having an angle of incline in the lengthwise direction of said rail such that the weight of the wheel acting on each test rail develops a counterforce that acts in opposition to the drag force imposed by such wheel, with the effective angle of incline of the upper surface of the supporting means at the entering end of the test rail being steeper than the angle of incline of the upper surface of the stabilizing means at the leaving end of the test rail whereby the drag force necessary to move the test rail forwardly is lessened as the wheel moves therealong, independent detecting means for each test rail and responsive to forward movement thereof under the forces applied thereto during the passage of the wheel, indicating means actuated by said detecting means, and a control switch for one of said test rails normally maintaining the indicating means inoperative, said control switch having actuating means responsive to the arrival of the wheel at a selected point along said last-named test rail for enabling the indicating means.

27. The arrangement of claim 26 wherein each set of cooperating upper and lower surfaces is located at a point beyond the corresponding end of its test rail such that each test rail applies weight forces to all of the said upper surfaces associated therewith during the entire travel of said wheel thereover.

28. The arrangement of claim 26 wherein each of said supporting means has lower surfaces of V-shaped transverse cross-sectional configuration, with one upper surface being of inverted V-shaped transverse cross-sectional configuration and with a second upper surface being of flat cross-sectional configuration and wherein each of said antifriction means is a single ball bearing.

29. A device for the measurement of the operating characteristics of a railway car wheel which comprises a contact member located in a section of track and to be engaged by a railway car wheel passing thereover to move said contact member by the frictional resistance of said wheel, an electrical circuit, means connected to said contact member for varying an electrical current in said circuit, and indicating means connected to said electrical circuit for showing such current variations.

30. A device for the measurement of the operating characteristics of a railway car wheel which comprises a contact member located in a section of track and to be engaged and moved by the frictional resistance of a railway car wheel passing thereover, a strain gauge for varying an electrical current as said contact member is moved, and indicating means responsive to the variations in the electrical current for showing the operating characteristics of a railway car wheel passing over said contact member.

31. A device for the measurement of the operating characteristics of a railway car wheel which comprises a contact member located in a section of track and to be engaged and moved by the frictional resistance of a railway car wheel passing thereover, a spring member connected to said contact member, means connected to said spring member for varying an electrical current, and indicating means responsive to variations in the electrical current, for showing the operating characteristics of a railway car wheel.

32. A device for the measurement of the operating characteristics of a railway car wheel which comprises a contact member located in a section of track, and to be engaged and moved by a railway car wheel passing thereover, means for varying an electrical current in response to movements of said contact member, means for amplifying said electrical current variations, and indicating means for showing said current variations.

33. A device for the measurement of the operating characteristics of a railway car wheel which comprises a contact member located in a section of track and to be engaged and moved by the frictional resistance of a railway car wheel passing thereover, a bar spring member connected at one end to said contact member, said bar being deflected upon movement of said contact member, means for varying an electrical current in response to deflection of said bar, and indicating means responsive to said current variations for showing the operating characteristics of a railway car wheel.

34. A device for the measurement of the operating characteristics of a railway car wheel which comprises a horizontally slidable contact member located in a section of track and to be engaged by a railway car wheel passing thereover to move said contact member by the frictional resistance of said wheel, an electrical circuit, means connected to said contact member for varying an electrical current in said circuit, and indicating means connected to said electrical circuit for showing such current variations.

35. The method of testing bearings that support a railway car from an axle carried by car wheel means; comprising rolling the car over test rail means in a section of track to cause the car wheel means to apply drag and weight forces to the test rail means thus producing a response of the test rail means in accordance with the drag forces and weight forces applied thereto during rolling movement of the car wheel means thereover, detecting such response of the test rail means in accordance with the ratio of the drag forces to the weight forces, and indicating the value of the ratio thus detected.

36. The method of testing bearings that support a railway car from an axle carried by a pair of wheels that are integral therewith, comprising rolling the car over test track means, substantially simultaneously producing a response in the test track means for each of the two wheels of a given axle in accordance with the drag forces and weight forces applied thereto during rolling movement of said pair of car wheels thereover, detecting such response of the test track means in accordance with the ratio of the drag forces to the weight forces, and indicating the value of the ratio thus detected.

References Cited in the file of this patent
UNITED STATES PATENTS

| | | |
|---|---|---|
| 283,632 | Merrill | Aug. 21, 1883 |
| 1,186,737 | Bohannan | June 13, 1916 |
| 1,846,414 | Cassler et al. | Feb. 23, 1932 |
| 1,887,992 | Casler | Nov. 15, 1932 |
| 1,976,632 | Piquerez | Oct. 9, 1934 |
| 1,995,578 | Piquerez | Mar. 26, 1935 |
| 2,837,911 | Haggadone | June 10, 1958 |
| 3,033,018 | Haggadone | May 8, 1962 |